US012749283B2

(12) United States Patent
Kim

(10) Patent No.: US 12,749,283 B2
(45) Date of Patent: Sep. 29, 2026

(54) ELECTRONIC DEVICE, VIDEO SYSTEM INCLUDING THE SAME, AND METHOD FOR GENERATING IMAGE PATTERN OF TEST VIDEO

(71) Applicant: Samsung Electronics Co., Ltd., Suwon-si (KR)

(72) Inventor: Tae Hong Kim, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 182 days.

(21) Appl. No.: 18/441,124

(22) Filed: Feb. 14, 2024

(65) Prior Publication Data

US 2024/0371123 A1 Nov. 7, 2024

(30) Foreign Application Priority Data

May 2, 2023 (KR) ........................ 10-2023-0056893

(51) Int. Cl.

| | |
|---|---|
| ***G06K 9/00*** | (2022.01) |
| ***G06T 7/90*** | (2017.01) |
| ***G06V 10/56*** | (2022.01) |
| ***G06V 10/70*** | (2022.01) |
| ***G06V 10/98*** | (2022.01) |

(52) U.S. Cl.

CPC ................ *G06V 10/56* (2022.01); *G06T 7/90* (2017.01); *G06V 10/70* (2022.01); *G06V 10/98* (2022.01); *G06T 2207/10024* (2013.01)

(58) Field of Classification Search

CPC ........ G06V 10/56; G06V 10/70; G06V 10/98; G06T 7/90; G06T 2207/10024; G09G 2320/0242; G09G 3/006; G09G 5/003; G09G 5/36; H04N 17/004; H04N 17/02; H04N 7/0102; H04N 7/0117

See application file for complete search history.

(56) References Cited

U.S. PATENT DOCUMENTS

| | | | |
|---|---|---|---|
| 7,567,092 | B2 | 7/2009 | Park et al. |
| 9,154,832 | B2 | 10/2015 | Valdez et al. |
| 9,723,303 | B2 | 8/2017 | Chabreck et al. |
| 10,306,270 | B2 | 5/2019 | Turmel et al. |

(Continued)

FOREIGN PATENT DOCUMENTS

| | | | |
|---|---|---|---|
| JP | 2008177704 | A | 7/2008 |
| KR | 20100071315 | A | 6/2010 |

*Primary Examiner* — Gregory A Morse
*Assistant Examiner* — Owais I Memon
(74) *Attorney, Agent, or Firm* — Harness, Dickey & Pierce, P.L.C.

(57) ABSTRACT

A sink device comprises processing circuitry configured to, receive a test video from a source device, perform a standardization operation on the test video to generate a standardized video, scale the standardized video to generate a scaled video, perform an image quality processing operation on the scaled video to generate a sampling video, output the sampling video to a display, the display configured to display the sampling video as a final sampling video, and detect at least one error generated in any one of the source device, the processing circuitry, or the display based on pixel values of the test video, the standardized video, the scaled video, the sampling video, and the final sampling video and desired pixel values corresponding to the type pattern included in each of the plurality of frames.

20 Claims, 12 Drawing Sheets

(56) References Cited

U.S. PATENT DOCUMENTS

| | | | | |
|---|---|---|---|---|
| 10,769,972 | B2 | 9/2020 | Kim | |
| 2005/0157799 | A1 * | 7/2005 | Raman | H04N 19/513 375/E7.193 |
| 2013/0259139 | A1 * | 10/2013 | Valdez | H04N 21/44008 375/240.26 |
| 2014/0267780 | A1 * | 9/2014 | Spears | H04N 17/02 348/181 |
| 2016/0205397 | A1 * | 7/2016 | Martin | H04N 17/04 348/192 |
| 2018/0167630 | A1 * | 6/2018 | Zhao | G06T 1/0092 |

* cited by examiner

<Frame No. 1010101 >

<Frame No. 1010101 >

ELECTRONIC DEVICE, VIDEO SYSTEM INCLUDING THE SAME, AND METHOD FOR GENERATING IMAGE PATTERN OF TEST VIDEO

CROSS-REFERENCE TO RELATED APPLICATION

This U.S. non-provisional application claims the benefit of priority under 35 U.S.C. 119 from Korean Patent Application No. 10-2023-0056893 filed on May 2, 2023 in the Korean Intellectual Property Office, the contents of which are herein incorporated by reference in its entirety.

BACKGROUND

Various example embodiments of the inventive concepts relate to an electronic device, and more particularly, to an electronic device that processes and reproduces a video, a video system, and/or a method for generating an image pattern of a test video reproduced for error detection in the electronic device.

Various video services transmit video images for display on a display panel over network environments. An input device may transmit a video through, for example, Mobile Industry Processor Interface (MIPI), High Definition Multimedia Interface (HDMI), Display Port (DP), or Peripheral Component Interconnect Express (PCIe).

When the video is received from the input device or processed and reproduced by the electronic device, image interruption phenomena, such as a judder phenomenon and/or a stuttering phenomenon, may occur. When the image interruption phenomenon is caused by the input device, the error of the input device needs to be resolved, and when the image interruption phenomenon is caused by the electronic device, the error of the electronic device needs to be resolved.

Accordingly, there is a demand for a technique for easily and/or accurately detecting a portion and/or component in which an error occurs in a process of receiving and reproducing the video.

SUMMARY

One or more example embodiments of the inventive concepts provide an electronic device for detecting an error occurrence and an error occurrence position of the electronic device by reproducing a test video and/or a video system including the same, etc.

One or more example embodiments of the inventive concepts also provide a method for generating a test video for an electronic device in which a type pattern for detecting an error occurrence and an error occurrence position is encoded.

One or more example embodiments of the inventive concepts provides a sink device comprising processing circuitry configured to, receive a test video from a source device, the test video including a plurality of frames and each frame of the plurality of frames including a type pattern corresponding to a frame number of the respective frame, perform a standardization operation on the test video to generate a standardized video, scale the standardized video to generate a scaled video, perform an image quality processing operation on the scaled video to generate a sampling video, output the sampling video to a display, the display configured to display the sampling video as a final sampling video, and detect at least one error generated in any one of the source device, the processing circuitry, or the display based on pixel values of the test video, the standardized video, the scaled video, the sampling video, and the final sampling video and desired pixel values corresponding to the type pattern included in each of the plurality of frames.

One or more example embodiments of the inventive concepts provides a method for generating a test video for an electronic device, the method comprising setting a first frame size of a first test video, generating a plurality of binary patterns representing a plurality of frame numbers using binary bits, the plurality of frame numbers corresponding to an order of a plurality of frames to be included in the first test video, generating a plurality of color patterns based on the binary bits, and transmitting the first test video to an electronic device to test operation of the electronic device, the first test video including a plurality of test frames, the plurality of test frames including the plurality of color patterns.

One or more example embodiments of the inventive concepts provides an electronic device, the electronic device comprising processing circuitry configured to, receive a test video from an input device, the test video including a plurality of frames, process and convert the test video to an intermediate sampling video, process the intermediate sampled video to a final sampling video and output the final sampling video to a display, and detect a frame output order error or a color output error in the processing circuitry or the display based on pixel values corresponding to a plurality of frame numbers included in each of the test video, the intermediate sampling video, and the final sampling video, each of the videos including a binary pattern and a color pattern, the binary pattern representing the frame number of the respective frame using binary bits, and the color pattern generated based on the binary pattern.

One or more example embodiments of the inventive concepts provides an electronic device, the electronic device comprising processing circuitry configured to, receive a test video from an input device, the test video including a plurality of frames, and each frame of the plurality of frames includes at least one type pattern corresponding to a frame number for the respective frame, process and convert the test video to an intermediate sampling video, process the intermediate sampled video to a final sampling video and output the final sampling video to a display, and determine whether an error has occurred in the processing circuitry or the display using a weighted model on the test video, the intermediate sampling video, and the final sampling video.

BRIEF DESCRIPTION OF THE DRAWINGS

The above and other aspects and features of one or more example embodiments of the inventive concepts will become more apparent by describing in detail various example embodiments thereof with reference to the attached drawings, in which.

DETAILED DESCRIPTION

Hereinafter, an electronic device, a system including the electronic device, and/or a method for generating an image pattern of a test video, etc., according to various example embodiments of the inventive concepts will be described with reference to FIGS. 1 to 17.

Figure 1:
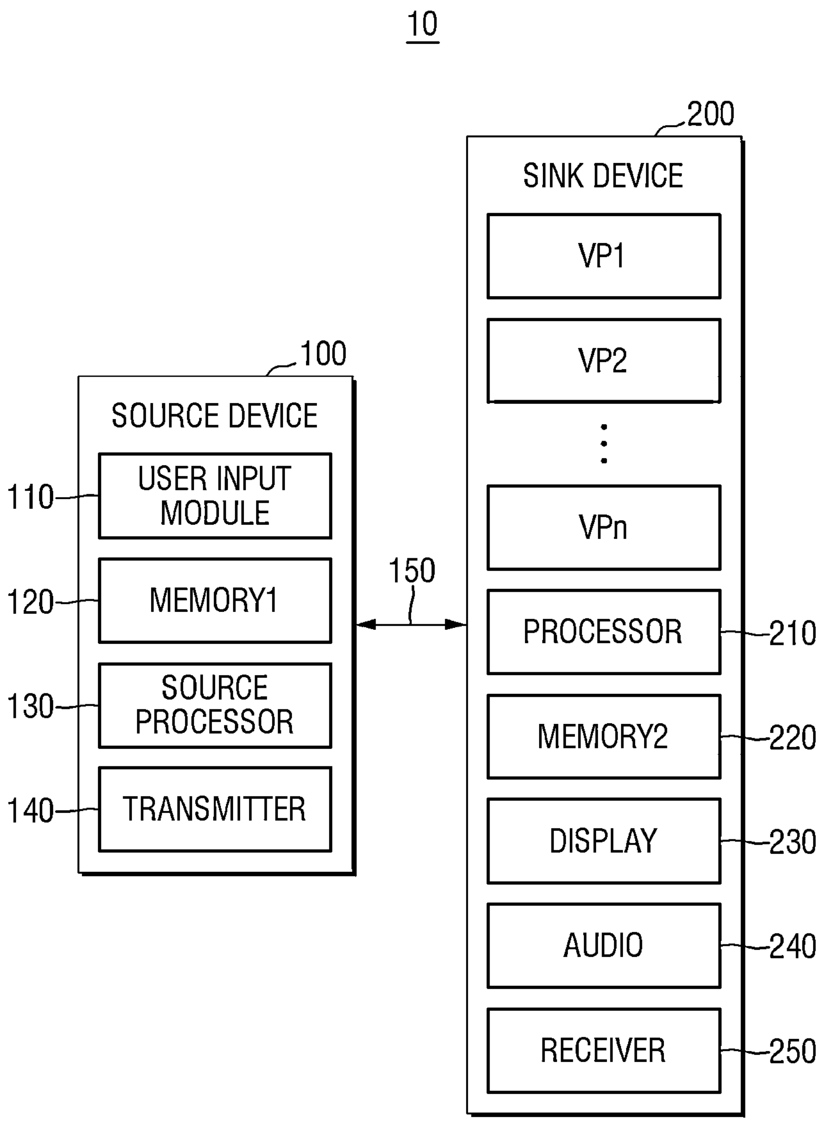
FIG. 1 is a block diagram illustrating a video system according to at least one example embodiment of the inventive concepts.

FIG. 1 is a block diagram illustrating a video system according to at least one example embodiment of the inventive concepts.

Referring to FIG. 1, a video system 10 may include a source device 100 and/or a sink device 200, etc., but the example embodiments are not limited thereto. According to at least one example embodiment, the video system 10 may further include other general-purpose components in addition to the components illustrated in FIG. 1, etc. Each of the source device and the sink device may be a multimedia device implemented as an electronic device, etc.

The source device 100 may be an electronic device that generates content video by itself and/or receives content video. The content video may include video frames, and may be generated as content data in the form of, for example, a data stream, etc., and transmitted to the sink device 200, but is not limited thereto. The source device 100 may be included in an input device, etc., but is not limited thereto. The source device 100 may be implemented in various forms, such as, for example, an optical media playback device, such as DVD or Blu-ray player, a UHD player, a set-top box, a TV, a computer, a mobile device, a home theater, a game console device, a content server, and the like. The content data may include video data and/or audio data. Additionally, the content data may include video data and audio data.

In at least one example embodiment, the source device 100 may include a user input module 110, a first memory 120, a source processor 130, and/or a transmitter 140, etc., but is not limited thereto. According to some example embodiments, one or more of the user input module 110, the first memory 120, the source processor 130, and/or the transmitter 140, etc., may be implemented as processing circuitry. Processing circuitry may include hardware or hardware circuit including logic circuits; a hardware/software combination such as a processor executing software and/or firmware; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc., but is not limited thereto.

The user input module 110 (e.g., user input device, etc.) may be a module prepared to be manipulated by a user, or in other words, a device configured to receive a user input. The user input module 110 may include various types of input interface related circuits. For example, the user input module 110 may be implemented in various forms, such as a mechanical and/or electronic button of the source device 100, a remote controller separated from a main body of the source device 100, a touch pad, and/or a touch screen, a keyboard, a mouse, a microphone, a camera, etc.

The first memory 120 may read stored data and/or output the read data under the control of the source processor 130. Additionally, the first memory 120 may store data under the control of the source processor 130. For example, the first memory 120 may store content video and/or content audio, etc. The first memory 120 may be implemented as a non-volatile memory that stores data regardless of power supply and/or a volatile memory that operates only when power is supplied. The non-volatile memory includes, e.g., a flash memory and/or a read only memory (ROM), etc., and the flash memory may include, for example, a NAND flash memory and/or a NOR flash memory, etc. The volatile memory may include, for example, DRAM and/or SRAM, etc.

The source processor 130 may control the source device 100 as a whole. The source processor 130 may control the first memory 120 so that the first memory 120 outputs the content data (e.g., content video and/or content audio), etc. The source processor 130 may output content data in a format supported by the sink device 200.

The transmitter 140 may transmit the content video to the sink device 200, but is not limited thereto. For example, the transmitter 140 may transmit the content video to a receiver 250 of the sink device 200, etc. Specifically, the transmitter 140 may transmit the content video to the receiver 250 through at least one communication channel 150, etc.

The communication channel 150 may transmit the content video and/or content audio output from the source device 100 to the receiver 250. The communication channel 150 may include any wireless and/or wired communication medium, such as a radio frequency (RF) spectrum, infrared (IR) frequency spectrum, etc., one or more physical transmission lines, and/or any combination of wireless and wired media. The communication channel 150 may form a portion of a packet-based network, such as a local area network, a wide area network, and/or a global network such as the Internet, but is not limited thereto. The communication channel 150 generally represents any suitable communication medium and/or collection of different communication mediums for transmitting the content video from the source device 100 to the sink device 200.

The source device 100 may transmit a test video to the sink device 200, but is not limited thereto. The test video may be an image pattern for confirming an occurrence of errors in the video system 10. The test video may include a plurality of frames. Each of the plurality of frames may include at least one pattern. The test video may be transmitted in the form of a data stream, and the data stream may include pixel values included in at least one test video frame.

For example, the data stream may include pixel values included in at least one pattern included in the test video frame.

According to some example embodiments, the test video may be stored in the first memory 120, etc. The source processor 130 may control the first memory 120 so that the first memory 120 outputs the test video. The transmitter 140 may transmit the test video to the sink device 200. For example, the transmitter 140 may transmit the test video to the receiver 250 through the communication channel 150, etc.

The test video may include various types of patterns for detecting which component in the sink device 200 and/or the source device 100 has a problem. In some example embodiments, each of the plurality of frames of the test video may include a pattern of a desired and/or predetermined type. For example, a first type pattern may correspond to an output order of each of the plurality of frames, but the example embodiments are not limited thereto. For example, when one test video includes four frames, a first frame may include a first type pattern corresponding to an output order No. 1, a second frame may include a first type pattern corresponding to an output order No. 2, a third frame may include a first type pattern corresponding to an output order No. 3, and a fourth frame may include a first type pattern corresponding to an output order No. 4, etc. For example, the first type pattern may be a pattern of a desired and/or preset color corresponding to a frame order, but is not limited thereto.

For example, a second type pattern may represent a plurality of colors, but is not limited thereto. For example, the second type pattern may be a gray pattern including black and white colors, but is not limited thereto. Additionally, for example, the second type pattern may be a pattern including R (Red), G (Green), and B (Blue) colors (hereinafter, referred to as an RGB pattern). Additionally, for example, the second type pattern may be a pattern including Y, Cb, and Cr colors (hereinafter, referred to as a YCbCr pattern). Additionally, for example, the second type pattern may include an RGB color and a complementary RGB color for each frame. Additionally, for example, the second type pattern may include a YCbCr color and a complementary YCbCr color for each frame. The first type pattern and the second type pattern will be described later in more detail.

The test video may be represented by N bits. N bits may be a representation for identifying a unique number for each frame. For example, when the test video is 2 bits, the first type pattern may be represented as 4 frames identified by 2 bits. At 00, the first frame of the first type pattern corresponding to the output order No. 1 may be displayed in the sink device 200, at 01, the second frame of the first type pattern corresponding to the output order No. 2 may be displayed in the sink device 200, at 10, the third frame of the first type pattern corresponding to the output order No. 3 may be displayed in the sink device 200, and at 11, the fourth frame of the first type pattern corresponding to the output order No. 4 may be displayed in the sink device 200, etc.

According to some example embodiments, the first type pattern displayed by the two bits, 00, 01, 10, and 11, may be a color whose density is divided into four grades. For example, the first type pattern may also be a color divided into four grades from white to black, or may also be a color divided into four grades from white or black to blue, etc. According to some example embodiments, the first type pattern displayed by the two bits, 00, 01, 10, and 11, may be a pattern in which each bit is displayed in one color. 0 may be displayed as a first color and 1 may be displayed as a second color. For example, when 0 is white and 1 is red, 10 may be displayed in a pattern of white and red, etc.

The example embodiments are not limited thereto, and the number of frames may vary, and the number of bits represented may also vary depending on the number of frames. For example, when the number of frames is 256, the test pattern may be a color pattern represented by 8 bits, etc.

For example, a third type pattern may be a pattern including at least two of a gray pattern, an RGB pattern, and/or a YCbCr pattern, but is not limited thereto. For example, the third type pattern may include an RGB pattern and a gray pattern for each frame. Additionally, for example, the third type pattern may include a YCbCr pattern and a gray pattern for each frame. Additionally, for example, the third type pattern may include an RGB pattern and a YCbCr pattern for each frame.

For example, the fourth type pattern may be a pattern that further includes integrity information for the first to third type patterns. The integrity information is information for confirming the integrity of the image pattern itself for the first to third type patterns. The integrity information may be parity bits, checksum information, and/or CRC information, etc., according to various example embodiments. The fourth type pattern may be a pattern including integrity information in the first type pattern, a pattern including integrity information in the second type pattern, and/or a pattern including integrity information in the third type pattern, etc.

According to some example embodiments, the test video may include a learning image pattern according to a result obtained by learning a normal image output during normal operation and an error image output during abnormal operation. For example, the test video may include a first region and a second region in one frame, output a normal image to the first region, and output a learning image to the second region, but the example embodiments are not limited thereto.

The source device 100 may transmit at least one test video of a plurality of test videos to the sink device 200. Each of the plurality of test videos may include a plurality of frames, and each of the plurality of frames may include at least one pattern described above, but is not limited thereto. In at least one example embodiment, each of the plurality of test videos may have different video resolutions, but is not limited thereto, and for example, two or more test videos may have the same resolution. For example, the resolution of the first test video may be 3840×2160, etc. The resolution of the second test video may be 512×480. However, the example embodiments of the inventive concepts are not limited to the listed examples, and the number of test videos may vary, such as 100 or 1000, and the test videos may have different resolutions.

The plurality of test videos may be stored in the first memory 120. The source processor 130 may control the first memory 120 so that the first memory 120 outputs at least one of the plurality of test videos. The transmitter 140 may transmit at least one test video to the sink device 200. Specifically, the transmitter 140 may transmit at least one test video to the receiver 250 through the communication channel 150, etc.

Although it has been described in FIG. 1 that the test video is transmitted from the source device 100, the test video is not limited thereto. The test video may also be transmitted to the sink device 200 from an external storage device (not illustrated) and/or a network, etc. The external storage device may be connected to the sink device 200 to store the test video. Specifically, the external storage device may receive a command and an address from the sink device 200 and access a memory cell selected by an address among memory cells, etc.

The external storage device may be, for example, a flash memory based storage device, but the example embodiments are not limited thereto. The flash memory may include, for example, a NAND flash memory, a NOR flash memory, and the like. The flash memory based storage device may include, for example, a solid state drive (SSD) and/or a universal serial bus (USB) based flash drive device, etc. The external storage device may be implemented as a removable drive, but is not limited thereto. The external storage device may be implemented as a non-transitory recording medium, such as a video compact disk (CD), a digital video disk (DVD), etc.

The sink device 200 may be an electronic device that receives, processes and/or reproduces the received video. The sink device 200 may receive, process and/or reproduce the test video transmitted from the source device 100. Here, the term "reproduction" means performing a processing operation to display a video, displaying an image according to the processed video data, outputting audio according to the processed audio data, and/or representing video and/or audio according to the processed video data and/or audio data, etc. The sink device 200 may be implemented in various forms, such as a TV, a monitor, a portable multimedia player, a mobile phone, a tablet, an electronic picture frame, an electronic blackboard, a gaming console, a virtual reality and/or augmented reality headset, and/or an electronic billboard, etc.

In at least one example embodiment, the sink device 200 may include a plurality of video processors vp1, vp2, . . . vpn, at least one processor 210, a second memory 220, a display 230, an audio device 240, and/or a receiver 250, etc., but the example embodiments are not limited thereto. According to some example embodiments, one or more of the plurality of video processors, the at least one processor 210, the second memory 220, and/or the receiver 250, etc., may be implemented as processing circuitry. Processing circuitry may include hardware or hardware circuit including logic circuits; a hardware/software combination such as a processor executing software and/or firmware; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc., but is not limited thereto.

The video processors vp1, vp2 . . . vpn may perform processing operations for reproducing video, etc. The processing operation may refer to processing a video so that the video may be displayed on a display (e.g., display panel, display device, projector, etc.). For example, the processing operation may include a standardization operation, a decoding operation, a scaling operation, a color correction operation, a frame rate change operation, an image quality processing operation, and the like. However, the processing operation is not limited to the listed examples.

The video processors vp1, vp2, . . . vpn may perform processing operations for reproducing content video, etc. The video processors vp1, vp2, . . . vpn may perform processing operations for reproducing test video. Each of the video processors vp1, vp2, . . . vpn may perform a processing operation corresponding to each of the video processors vp1, vp2, . . . vpn.

Each of the video processors vp1, vp2, . . . vpn may perform a corresponding processing operation on the test video and/or generate a sampling video, etc. Each of a plurality of frames of the sampling video may include at least one pattern. The video processors will be described in more detail in connection with FIG. 2.

For example, the first video processor vp1 may perform a standardization operation, and the second video processor vp2 may perform a scaling operation, etc. The first video processor vp1 may receive a test video and perform the standardization operation on the test video. The second video processor vp2 may perform a scaling operation on the test video. Specifically, the second video processor vp2 may perform a scaling operation on the standardized test video.

Figure 2:
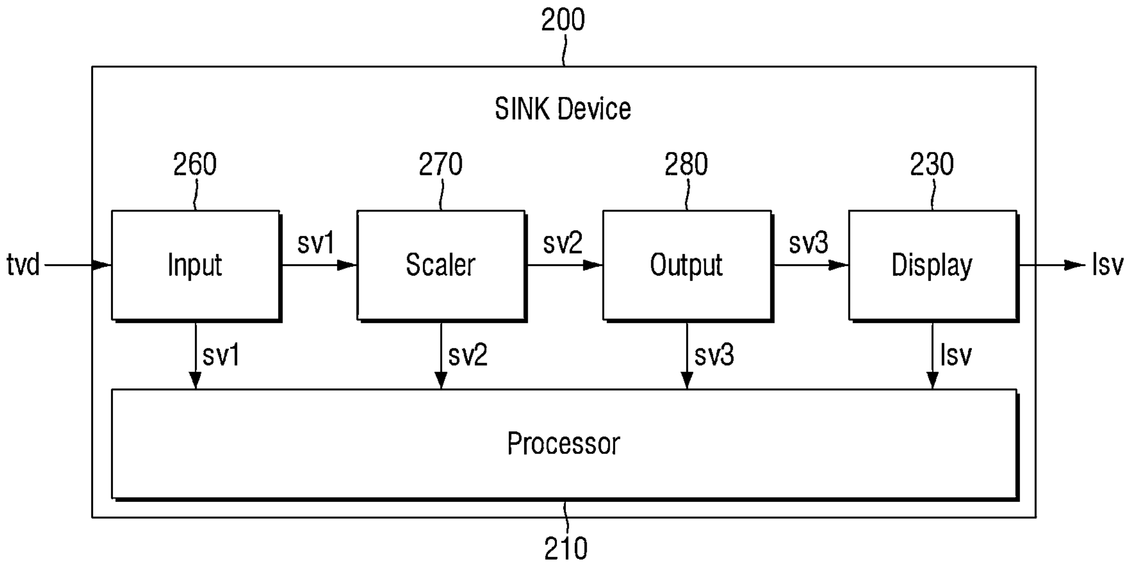
FIG. 2 is a view for describing an operating method of an electronic device according to some example embodiments.

For example, the first video processor vp1 may be an input module (e.g., input module 260 in FIG. 2). The input module may receive a test video tvd and perform a standardization operation on the test video. The standardization operation may refer to an operation of changing the received video to suit the characteristics (e.g., desired characteristics, etc.) of the sink device 200. The first video processor vp1 may output a first sampling video sv1 in which the test video tvd is standardized.

The second video processor vp2 may be a scaler (e.g., scaler 270 in FIG. 2). The scaler may perform a scaling operation on the test video sv1. The processing operation corresponding to the scaler may be a scaling operation. The scaling operation may refer to an operation of changing a size (e.g., resolution) of a video to suit a size (e.g., resolution) of the display 230. Specifically, the second video processor vp2 may receive the first sampling video from the first video processor vp1 and perform the scaling operation on the first sampling video sv1, etc.

The third video processor vp3 may be an output module (e.g., output module 280 in FIG. 2). The output module may receive the scaled sampling video sv2, perform a picture quality processing operation, and output a third sampling video sv3.

The processor 210 may determine whether an error has occurred in at least one of the source device 100 and the sink device 200, which are input devices. The processor 210 may receive a sampling video on which a processing operation corresponding to each of the video processors is performed on the test video from at least one of the video processors vp1, vp2, . . . vpn, but the example embodiments are not limited thereto. For example, the processor 210 may receive the sampling video (e.g., output video) from each of the video processors vp1, vp2, . . . vpn, but the example embodiments are not limited thereto. For example, the processor 210 may first receive the sampling video from an n-th video processor vpn and then receive the sampling video from other video processors.

The processor 210 may check an output order of each of the plurality of frames of the sampling video and determine whether the sampling video is normally output (e.g., properly output, correctly output, correctly processed, etc.) based on at least one pattern (e.g., test pattern), etc. Specifically, the processor 210 may check the image output order and normal output based on at least one pattern included in each of the plurality of frames of the sampling video.

Based on the pattern of the test video, the processor 210 may check the output order of each of the plurality of frames, a position where an error occurred, a color where an error occurred, and the like, but is not limited thereto. The test video may include a frame number allocated to each frame of the test video according to some example embodiments. The processor 210 may differently allocate the number of bits corresponding to the frame number for each type pattern, but is not limited thereto. For example, a frame number including 7 bits may be allocated to the first type pattern, and a frame number including 9 bits may be allocated to the second type pattern, etc.

For example, the processor 210 may receive a video from at least one of the video processors vp1, vp2, . . . vpn, and check frame information included in the video. Specifically, the processor 210 may detect at least one error from a frame included in an input video of any one of the test video tvd, the standardized video sv1, the scaled video sv2, the sampling video sv3, and/or the final sampling video 1*sv*, etc.

According to some example embodiments, the processor 210 may check the output order of frames including the first type patterns based on the first type patterns included in each frame. For example, when there are four frames, the processor 210 may check whether a first frame, a second frame, a third frame, and a fourth frame are output in order, etc. In this case, the frame number includes 2 bits, may be allocated to the first frame, may be allocated to the second frame, may be allocated to the third frame, and may be allocated to the fourth frame, etc. The processor 210 may check whether an error has occurred in the image output order by checking whether the frame number of the output frame is output as [00], [01], [10], and when the first frame to the fourth frame are input in order, etc.

According to some example embodiments, the processor 210 may check whether the input video is normally output based on a type pattern displaying black and white colors and/or a plurality of other colors. For example, the processor 210 may check whether or not the output is normally performed based on pixel values of pixels implementing the second to fourth type patterns, etc. For example, when the frame number of the output frame is [00], [01], [10], and [11], the processor 210 may check whether the output is normally performed by displaying the pixel value of the color corresponding to each frame number, etc. For example, when represented in gray scale, 00 may be displayed as black, 01 may be displayed as first gray, 10 may be displayed as second gray, and 11 may be displayed as white, on the display 230 of the sink device 200. However, the example embodiments of the inventive concepts are not limited thereto, and according to various example embodiments, the pixel values may also be RGB data, YCbCr data, black and white data and/or other color type data, and/or may also be color data including at least two of RGB data, YCbCr data, black and white data, and other color type data, etc.

The processor 210 may determine whether the input video is normally output based on a comparison between the pixel values of the pixels implementing a type pattern according to various example embodiments and a desired and/or preset pixel value. The processor 210 may receive an input video from at least one of the video processors vp1, vp2, . . . vpn, and check whether each input video is normally output based on results of the comparison between pixel values. The normal output may refer to a processing operation which is normally performed in the video processor and no output order error and/or color display error occurs (e.g., the output video matches the expected and/or desired video). For example, the processor 210 may check whether the first sampling video is normally output based on the second type pattern included in the first sampling video and may determine whether the first sampling video matches an expected and/or desired output video of the second type pattern, etc. Whether the first sampling video is normally output will be described in greater detail with reference to FIG. 4.

The processor 210 may determine whether an error has occurred in at least one of the input device and/or the electronic device based on the output order of each of the plurality of frames of the input video and whether or not the plurality of frames are normally output. The input video includes at least one of the test video tvd, the standardized video sv1, the scaled video sv2, the sampling video sv3, and the final sampling video 1*sv*, etc. Here, the input device may refer to the source device 100, and the electronic device may refer to the sink device 200, etc.

The processor 210 may determine whether or not an error has occurred in at least one of the input device and video processors vp1, vp2, . . . vpn based on the output order error of the input video and/or whether the input video is normally output. If no frame output sequence error of the input video output from at least one of the video processors (e.g., video processors vp1, vp2, . . . vpn) occurs and the input video is normally output, the processor 210 may determine that no error has occurred in the input device 100 and sink device 200.

If at least one of the frame output order error of the first sampling video output from the first video processor vp1 and an abnormal output of the first sampling video occurs, the processor 210 may determine that an error has occurred in the input device. For example, if the output order error of the first sampling video occurs (e.g., the frames of the first sampling video are output in an incorrect order and/or one or more frames of the first sampling video are missing, etc.), the processor 210 may determine that an error has occurred in the source device 100.

If at least one of an output order error and abnormal output of the sampling video output from at least one of the video processors vp2 . . . vpn other than the first video processor vp1 occurs, and an output order error and abnormal output of the first sampling video do not occur, the processor 210 may determine that an error has occurred in the electronic device. For example, if an output order error of the second sampling video output from the second video processor vp2 occurs, and the output order error and abnormal output of the first sampling video do not occur (e.g., the first sampling video was output correctly), the processor 210 may determine that an error has occurred in the sink device 200.

In at least one example embodiment, the processor 210 may determine whether an error has occurred in at least one of the input device and the video processors vp2 . . . vpn based on the output order of each of the plurality of frames of the input video and whether or not the plurality of frames are normally output. For example, if an output order error of the second sampling video output from the second video processor vp2 occurs, and the output order error and abnormal output of the first sampling video do not occur (e.g., the first sampling video was output correctly), the processor 210 may determine that an error has occurred in the second video processor vp2.

The processor 210 may include one or more of a central processing unit (CPU), a graphic processor unit (GPU), a micro controller unit (MCU), a micro processing unit (MPU), an application processor (AP), and/or an ARM processor, but is not limited thereto. In addition, the processor 210 may also be implemented as a system-on-chip (SoC) and/or a large scale integration (LSI) in which a processing algorithm is embedded and/or may also be implemented in the form of a field programmable gate array (FPGA), etc., but is not limited thereto.

The second memory 220 may store the pixel values of pixels implementing the test video. Specifically, the second memory 220 may store a desired and/or preset pixel value for the processor 210 to check the output order error of the plurality of frames of the sampling video and whether the sampling video is normally output. The second memory 220 may be implemented as a non-volatile memory that stores data regardless of power supply and/or a volatile memory that operates only when power is supplied. The non-volatile memory may be a flash memory and/or a ROM, etc., and the flash memory may include, for example, a NAND flash memory and/or a NOR flash memory, but the example embodiments are not limited thereto. Volatile memory may include, for example, a dynamic random access memory (DRAM) and/or a static random access memory (SRAM), etc.

The display 230 may display at least one image based on the content video for which the processing operations are performed by the video processors vp1, vp2, . . . vpn. According to at least one example embodiment, the display 230 may also display at least one image based on the test video for which the processing operations are performed by the video processors vp1, vp2, . . . vpn. The sink device 200 may display output data to a user through the display 230. The display 230 may refer to a display panel, a display device, a projector, etc. The display panel is a display unit on which images are actually displayed, and may be one of display devices that display a 2D image by receiving an electrically transmitted image signal, such as a thin film transistor-liquid crystal display (TFT-LCD), an organic light emitting diode (OLED) display, a field emission display, a plasma display panel (PDP), etc. The display panel may be implemented as a flat panel display and/or a flexible display panel of another type, etc. In at least one example embodiment, the display 230 may display an 8K class image, but is not limited thereto.

In at least one example embodiment, the display 230 may display that at least one error has occurred when at least one error was detected in at least one of the input device and the electronic device while displaying the test video. When an error occurs in at least one of the input device and the electronic device, the display 230 may display and/or identify the device in which the error occurred. Specifically, if an error occurs in at least one of the source device 100 and the sink device 200, the processor 210 may control the display 230 to display an error occurrence notification and an error occurrence position, etc., but is not limited thereto.

The processor 210 receives the first sampling video in which the test video is standardized, and may determine that at least one error has occurred in the input device when at least one of a frame output order error of the first sampling video and/or an abnormal output of the first sampling video occurs. For example, the processor 210 may determine that an error has occurred in the source device 100. If the error occurs in the source device 100, the processor 210 may control the display 230 to display an error occurrence notification and/or an error occurrence position on the source device 100, but is not limited thereto. The processor 210 may control the display 230 to display information on an A/S center of the source device 100, etc.

If at least one of the frame output order error and abnormal output of the final sampling video for which the processing operations are performed on the first sampling video occurs, and at least one of the frame output order error and abnormal output of the first sampling video does not occur, the processor 210 may determine that an error has occurred in the video system 10. For example, the processor 210 may determine that an error has occurred in the sink device 200, but is not limited thereto. If the error occurs in the sink device 200, the processor 210 may control the display 230 to display an error occurrence notification and/or an error occurrence position on the sink device 200. The processor 210 may control the display 230 to display information on an A/S center of the sink device 200, but is not limited thereto. If the error occurs in the sink device 200, the processor 210 may inform the user that the error has occurred in the sink device 200 to the A/S center of the sink device through communication, etc.

If an error occurs in at least one of the input device and video processors vp1, vp2, . . . vpn, the display 230 may display an error occurrence notification and/or an error occurrence position, etc. For example, if an error occurs in the second video processor vp2, the processor 210 may control the display 230 to display that an error has occurred in the second video processor vp2, but is not limited thereto.

The audio device 240 (e.g., a speaker, etc.) may output audio based on the audio data transmitted from the source device 100.

The receiver 250 may receive the content video from the source device 100 through the communication channel 150. The receiver 250 may receive the test video from the source device 100 through the communication channel 150.

The transmitter 140, the communication channel 150, and the receiver 250 may be configured for communication according to and/or based on any wired and/or wireless communication system including one or more Ethernet, telephone, cable, power-line and fiber optic systems, and/or one or more code division multiple access (CDMA or CDMA2000) communication systems, frequency division multiple access (FDMA) systems, orthogonal frequency division multiple (OFDM) access systems, time division multiple access (TDMA) such as Global Mobile Communications System (GSM), general packet radio service (GPRS) or Enhanced Data GSM Environment (EDGE), Terrestrial Trunked Radio (TETRA) mobile phone systems, wideband code division multiple access (WCDMA), high data rate 1×EV-DO (Generation 1 evolution data only) or 1×EV-DO gold multicast system, IEEE 802.18 system, DMB system, DVB-H system, and/or a wireless system including other methods for data communication between two or more devices, etc.

FIG. 2 is a view for describing an operating method of an electronic device according to some example embodiments. An electronic device 200 of FIG. 2 may correspond to the sink device 200 of FIG. 1, and a processor 210 of FIG. 2 may correspond to the processor 210 of FIG. 1, but the example embodiments are not limited thereto. Description of duplicate content is omitted for the sake of brevity and clarity.

Referring to FIG. 2, the electronic device 200 may receive a test video tvd. The electronic device 200 may include at least one processor 210, an input module 260, a scaler 270, an output module 280, and/or a display 230, etc., but is not limited thereto. Each of the input module 260, the scaler 270, and/or the output module 280 may be included in the video processor (and/or may be implemented as processing circuitry), but is not limited thereto. FIG. 2 illustrates a case where the electronic device 200 includes three video processors. However, the electronic device 200 is not limited thereto and may include various numbers of video processors.

The input module 260 may receive the test video tvd. The input module 260 may correspond to the first video processor vp1 of FIG. 1, but is not limited thereto. The input module 260 may output a first sampling video sv1 by performing a standardization operation on the test video tvd. A processing operation corresponding to the input module 260 may be a standardization operation, but is not limited thereto. The standardization operation may refer to an operation of changing the received test video tvd to suit the characteristics of the electronic device 200. Specifically, the input module 260 may transform spatial information and/or time information of the test video tvd to internally process the test video tvd in the electronic device 200, etc.

The scaler 270 may receive the first sampling video sv1. The scaler 270 may correspond to the second video processor vp2 of FIG. 1. The scaler 270 may output a second sampling video sv2 by performing a scaling operation on the first sampling video sv1. The processing operation corresponding to the scaler 270 may be a scaling operation. The scaling operation may refer to an operation of changing a size of a video to suit a size of a display (e.g., the display 230 in FIG. 1). Specifically, the scaler 270 may output a second sampling video sv2 by expanding or contracting the first sampling video sv1 in the horizontal direction and/or vertically expanding or contracting the first sampling video sv1.

The output module 280 may receive the second sampled video sv2. The output module 280 may output a third sampled video sv3 by performing a quality processing operation on the second sampling video sv2, but is not limited thereto. The quality processing operation may refer to an operation of improving a quality of a video.

The display 230 may receive and display the third sampling video sv3. The display 230 may receive the third sampling video sv3 and display the third sampling video sv3 as a final sampling video 1*sv*.

The processor 210 may receive the first sampling video sv1, the second sampling video sv2, the third sampling video sv3, and the final sampling video 1*sv* from the input module 260, the scaler 270, the output module 280, and/or the display 230, respectively, but the example embodiments are not limited thereto. The processor 210 may detect an error generated in any one of the source device 100, the input module 260, the scaler 270, the output module 280, and/or the display 230, etc., by receiving the test video tvd, the standardized video sv1, the scaled video sv2, the sampling video sv3, and/or the final sampling video 1*sv*, and mapping these videos with a frame number of each of the plurality of frames.

For example, when a color level value of each pixel of the first sampling video sv1 corresponds to the frame number of the test video, the sink device determines that no error has occurred. For example, when a color level value of each pixel of the second sampling video sv2 does not correspond to the frame number of the test video, the sink device determines that an error has occurred in the scaler 270. In this way, the error may be detected by comparing the frame number with the sampling videos received in each of the blocks 260, 270, 280, and 230, etc. This will be described in more detail with reference to FIG. 4.

Figure 3:
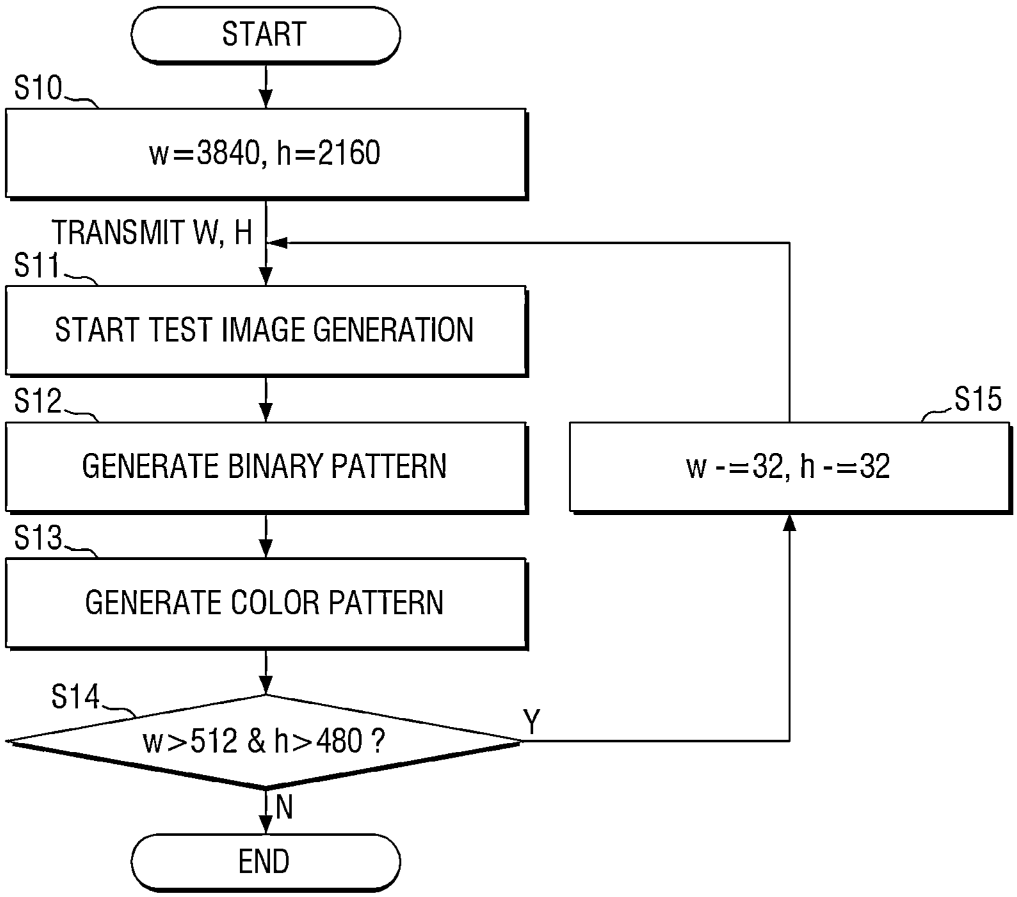
FIG. 3 is a flowchart illustrating a method for generating a test video in accordance with some example embodiments.

FIG. 3 is a flowchart illustrating a method for generating a test video in accordance with some example embodiments.

In order to generate the test video tvd of FIG. 2, referring to FIG. 3, a size of the test video is set based on a maximum resolution (e.g., a first resolution) of the display (S10), but the example embodiments are not limited thereto, and for example, a different resolution of the display may be used. For example, when the display 230 is a UHD display, a width w of the test video is set to 3840 pixels and a height h thereof is set to 2160 pixels according to the maximum resolution, but the example embodiments are not limited thereto.

An image pattern generation of the test video starts (S11). Since the test video includes a plurality of frames, a binary pattern and a color pattern associated with a frame number are generated for each frame (S12 and S13). Although the illustration has been described as generating the color pattern after generating the binary pattern, the binary pattern and the color pattern may be simultaneously generated according to various example embodiments.

In the generation of the binary pattern and the color pattern, a sink device checks whether the set size of the test video is the minimum size (e.g., a second resolution) supported by the display 230 (S14). For example, in the case of the UHD display 230, the minimum size may be 512 pixels in width w and 480 pixels in height h, but the example embodiments are not limited thereto. That is, if the video size has a width w of 512 pixels and a height h of 480 pixels, the generation of the image pattern of the test video is terminated (S14, N).

If the video pattern of the test video is greater than the minimum size, the sink device generates a video pattern of the test video having a smaller size through operations S11 to S13 while gradually reducing a current video size by a desired and/or predetermined unit (e.g., desired resolution and/or pixel amount, etc.) (S15). For example, in the case of the UHD display 230 described above, the sink device may reduce the width and height by 32 pixels, starting from 3840×2160, and may sequentially generate an image pattern with a size of 3808×2128 and an image pattern with a size of 3776×2096 to generate an image pattern with a size of 512×480, etc.

FIGS. 4 to 11 are views for describing an image pattern of a test video according to various example embodiments. The test video includes a plurality of frames, and each of the plurality of frames may include an image pattern similar to the example embodiments described with reference to FIGS. 4 to 11 below.

Figure 4:
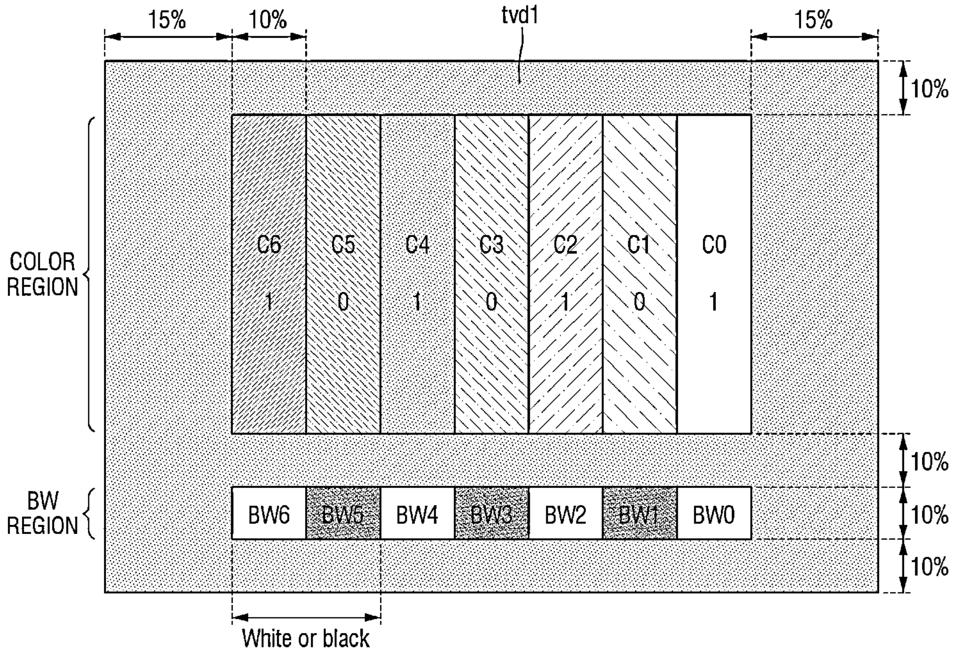
FIG. 4 is a view illustrating an image pattern of a test video according to at least one example embodiment.

FIG. 4 is a view illustrating an image pattern of a test video according to at least one example embodiment.

Referring to FIG. 4, the test video according to at least one example embodiment may include a binary pattern and a color pattern, but is not limited thereto.

The binary pattern may be displayed in a frame tvd to verify an error in the image output order of the video system 10. Each frame of a plurality of frames included in the test video may be identified by a frame number (e.g., a frame identifier, etc.). The binary pattern is a frame number converted into binary bits, and the frame number may be represented by n bit values (n is a natural number of 2 or more), but the example embodiments are not limited thereto.

For example, when the frame number is represented by 7 bits, the test video may include 128 (=27) frames. For the 85-th frame among the 128 frames, when a frame number thereof is converted into a bit value, it becomes "1010101", etc.

According to some example embodiments, when a binarized frame number is represented by a black and white binary pattern, it is assumed that, for example, 0 is represented in black and 1 is represented in white, but is not limited thereto, and for example, the 1 may be represented by a black color value and the 0 may be represented by a white color value. As illustrated, the 85-th test frame tvd1 may display a 7-pixel binary pattern corresponding to "1010101" in a BW area. Since the frame number of 7 bits increases or decreases sequentially from the first test frame to the 128-th test frame of the test video, the black and white pattern of the BW area changes according to and/or based on a certain and/or desired rule as the frame number increases or decreases. If the change of the binary pattern during reproduction of the test video is not coupled to the increase or decrease of the frame number, the processor 210 may detect an error in the image output order in the video system 10.

The color pattern may be displayed in the frame tvd to check whether an image is normally output (e.g., correctly output) by the display 230. The color pattern may be a pattern in which colors are displayed with at least two color pixels corresponding to the bit value based on the frame number, but the example embodiments are not limited thereto. The color pattern may be represented in various desired and/or preset colors according to various example embodiments, but for convenience of explanation, for example, a case in which the color pattern is displayed in R (Red), G (Green), B (Blue), Y (Yellow), C (Cyan), M (Magenta), and W (White) colors will be described, but are not limited thereto.

According to a first example embodiment, the color pattern may represent the same color of R, G, B, Y, C, M, and W in a color region for each frame. That is, R, G, B, Y, C, M, and W colors may be displayed and/or fixedly displayed in the regions of C6, C5, C4, C3, C2, C1, and C0, respectively. In this case, if a change is detected by checking the color pattern according to and/or based on the increase or decrease of the frame number during reproduction of the test video, the processor 210 may detect an error due to an abnormal image and/or undesired image being output.

Additionally, according to a second example embodiment, the color pattern may also be represented such that R, G, B, Y, C, M, and W are shifted for each frame. That is, in the regions of C6, C5, C4, C3, C2, C1, and C0, R, G, B, Y, C, M, and W may be represented for the first frame, W, R, G, B, Y, C, and M may be represented for the second frame, and M, W, R, G, B, Y, and C may be represented for the third frame. In this case, in the change of the color pattern according to and/or based on the increase or decrease of the frame number during reproduction of the test video, an abnormal output error may be detected in some regions of C6, C5, C4, C3, C2, C1, and C0 (e.g., other colors are well represented in C2 but Blue is not properly represented), etc.

According to some example embodiments, the color pattern and the binary pattern included in one frame may be disposed to be spaced apart from each other at a desired and/or predetermined interval on the display 230. That is, according to a third example embodiments, a binary pattern indicating a frame number may be represented in a second region (BW region) while the same color of R, G, B, Y, C, M, and W for each frame is fixed and represented to a first region (color region) as in the first example embodiment. According to a fourth example embodiment, a binary pattern for displaying a frame number may be represented in the second region (BW region) while the colors of R, G, B, Y, C, M, and W are shifted and represented in the first color region for each frame as in the second example embodiment.

In the illustrated example embodiments, the first region (color region) may be displayed on portions spaced apart from the edges of the screen of the display 230 in the left and right directions by, e.g., 15%, and regions spaced apart from the top by, e.g., 10% and from the bottom by, e.g., 30%, but the example embodiments are not limited thereto. The second region (BW region) may be displayed on portions spaced apart from the edges of the screen of the display 230 in the left and right directions by, e.g., 15%, and regions spaced apart from a lower side of the first region (color region) by, e.g., 10% and from the bottom thereof by, e.g., 10%, but the example embodiments are not limited thereto.

However, in the illustrated example embodiment, it is described that the first region (color region) and the second region (BW region) are vertically spaced apart from each other and displayed on the screen, but the example embodiment of the inventive concepts are not limited thereto. According to various example embodiments, for example, the first region and the second region may be displayed to be spaced apart from each other in the left and right directions, or may be displayed in a diagonal direction or a polygonal shape and displayed spaced apart from each other in at least two directions, etc.

Figure 5:
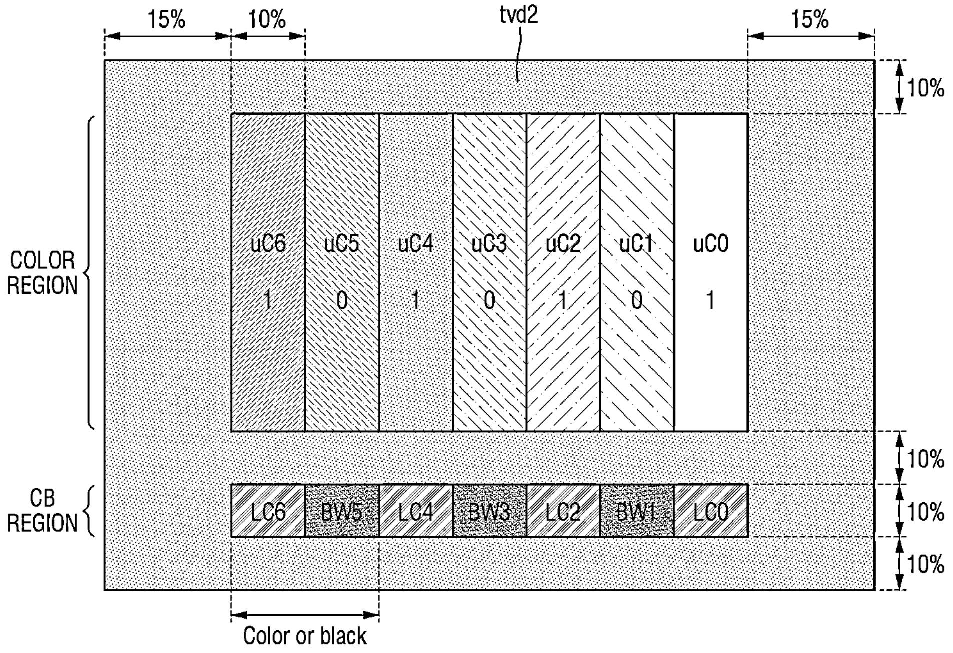
FIG. 5 is a view illustrating an image pattern of a test video according to at least one example embodiment.

FIG. 5 is a view illustrating an image pattern of a test video according to at least one example embodiment.

Referring to FIG. 5, the test video according to at least one example embodiment may include a binary pattern and a color pattern, but is not limited thereto. In an illustrated example, a CB region (color-black) may be represented by 0 as black and 1 as color (for example, any one of R, G, B, Y, C, M, and W, etc.). In the frame number "1010101", LC6, LC4, LC2, and LCO corresponding to 1 may be represented in color, and BW5, BW3, and BW1 corresponding to 0 may be represented in black, etc.

Specifically, unlike FIG. 4, in the binary pattern of the second region (CB region), according to some example embodiments, at least one pixel corresponding to the binary pattern of the frame number may be represented in two different colors. The binary pattern may be represented in black and blue according to at least one example embodiment, and may also be represented in white and red according to another example embodiment. Additionally, if the binary pattern is represented in two different colors, such as red and green, it will be said to correspond to at least one example embodiment of the inventive concepts.

As illustrated, when the color pattern is displayed as a pattern of 7 bits, the color pattern may represent the same color of R, G, B, Y, C, M, and W in a color region for each frame according to at least one example embodiment. That is, a color of a specific color may be displayed and/or fixedly displayed in the regions of uC6, uC5, uC4, uC3, uC2, uC1, and uC0. For example, the sink device displays and/or fixedly displays different first color, second color, third color, fourth color, fifth color, sixth color, and seventh color in the regions of uC6, uC5, uC4, uC3, uC2, uC1, and uC0 during reproduction of the test video, and checks a pixel value of the color region according to and/or based on the increase or decrease of the frame number. When a change in the pixel value is detected, the processor 210 may detect an error due to an abnormal image and/or undesired image being output.

Additionally, according to the second example embodiment, the color pattern may be represented so that the color of each of different sub-regions displayed in the color region is shifted for each frame. That is, in the regions of uC6, uC5, uC4, uC3, uC2, uC1, and uC0, R, G, B, Y, C, M, and W may be represented for the first frame, W, R, G, B, Y, C, and M may be represented for the second frame, and M, W, R, G, B, Y, and C may be represented for the third frame, but the example embodiments are not limited thereto. In this case, in the change of the color pattern according to and/or based on the increase or decrease of the frame number during reproduction of the test video, an abnormal output error may be detected in some regions of uC6, uC5, uC4, uC3, uC2, uC1, and uC0 (e.g., red color (R) is mostly represented well, but is not properly represented in uC3).

Figure 6:
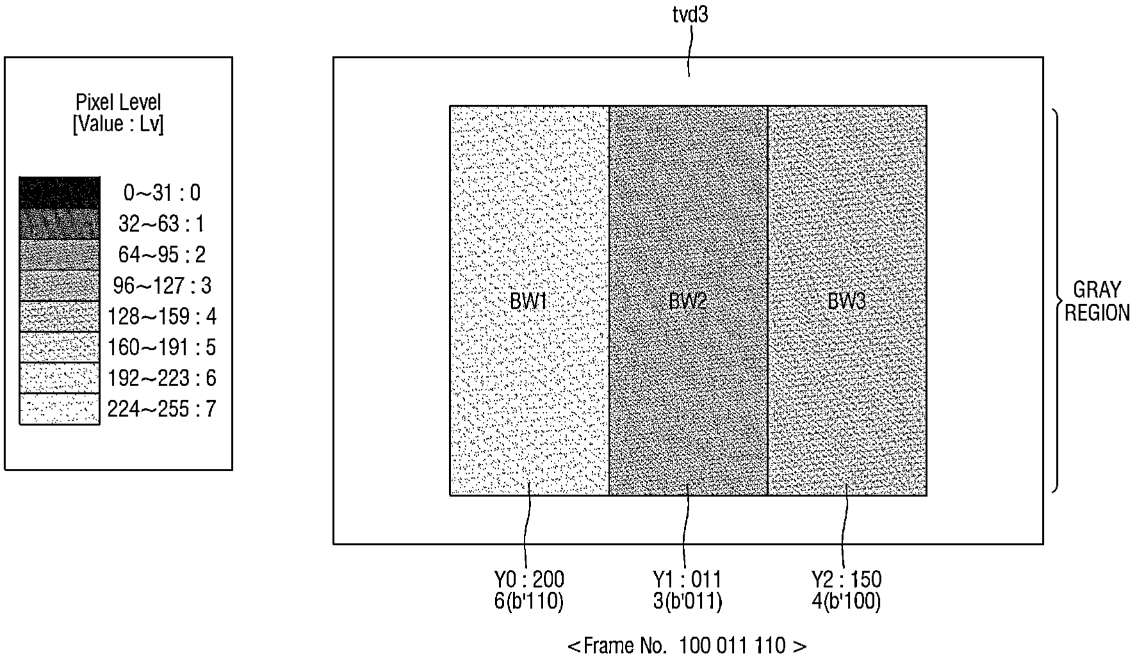
FIG. 6 is a view illustrating an image pattern of a test video according to at least one example embodiment.

FIG. 6 is a view illustrating an image pattern of a test video according to at least one example embodiment.

Referring to FIG. 6, an image pattern of a test video may be generated to correspond to a color level difference of pixel values, but is not limited thereto. If the color is divided into m levels (where m is a natural number of 2 or more) based on the pixel value, the color may be represented with bits as many as log 2 (m) levels in total. If a plurality of frames included in the test video are displayed on the display 230 with pixels having the color level value corresponding to the frame number, an output order error of an image may be detected.

For example, it is assumed that one test video includes 512 (=29) frames. If a 286-th frame of 512 frames is represented by a binary pattern, it may be represented by 9 bits, such as "100011110".

For example, it is assumed that pixel information is represented in a total of 8 levels divided into 3 bits. A pixel value that may be represented with 3 bits has a value of 0 to 255. For example, if the pixel information belongs to 0 to 31, the pixel information may be represented as a color corresponding to a color level value 0, and if the pixel information belongs to 32 to 63, the pixel information may be represented as a color corresponding to a color level value 1, etc. In the illustrated example, the pixel information is represented from black with a color level value of 0 to white with a color level value of 7, and may be represented so as to change from black to fading gray to white as the color level value increases from 0 to 7, but is not limited thereto.

If pixel information of the BW1 region is 200 (Y0=200), the pixel information is represented in a color corresponding to a color level value 6, if pixel information of the BW2 region is 100 (Y1=100), the pixel information is represented in a color corresponding to a color level value 3, and if pixel information of the BW3 region is 150 (Y2=150), the pixel information is represented in a color corresponding to a color level value 4, but the example embodiments are not limited thereto.

In this case, the color level values 6, 3, and 4 may each be converted into a pattern of 3 bits, and the frame number may be represented in a pattern of three bars, and thus may be represented in 9 bits. The frame number may be 100 011 110 with the bit patterns of BW1, BW2, and BW3, etc.

That is, the test frame tvd3 includes three sub-regions BW1, BW2, and BW3 divided by 3 bits, each sub-region may represent the pixel information in a color corresponding to a color level value, and the color level values of all sub-regions are coupled to the frame number to change. Therefore, when the test video is reproduced, the color level value of each sub-region is changed according to and/or based on the increase or decrease of the frame number, and the processor 210 may detect an error in the image output order by checking the color change of the sub-region according to the change in the color level value, etc.

For convenience of explanation, it has been described as the pixel information divided into 3 bits and represented in 8 (=23) levels, but according to various other example embodiments, the pixel information may also be represented by pixels of 4 (=22) levels divided by 2 bits or by pixels of 16 levels divided by 4 bits (=24), etc.

Figure 7:
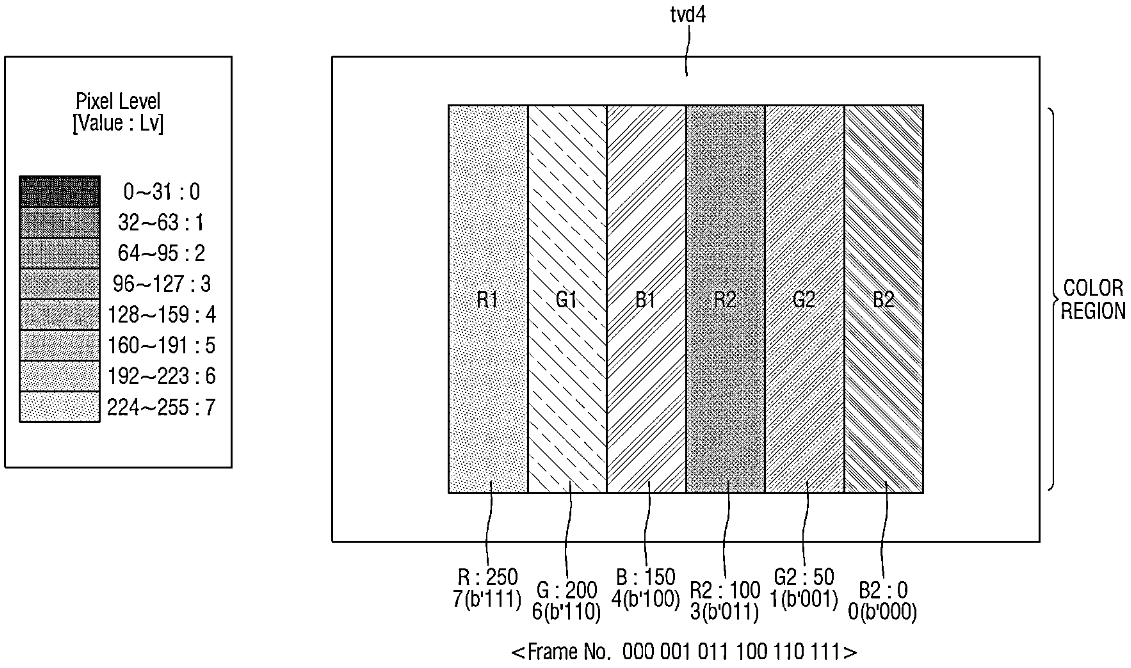
FIG. 7 is a view illustrating an image pattern of a test video according to at least one example embodiment.
Figure 8:
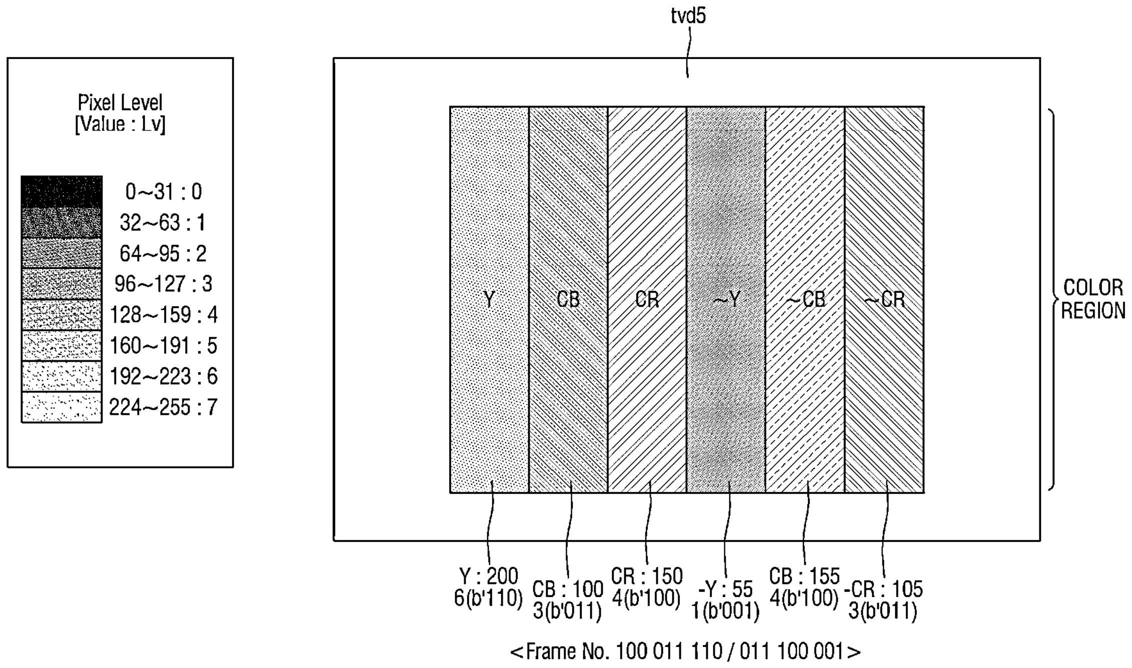
FIG. 8 is a view illustrating an image pattern of a test video according to some example embodiments.

FIG. 7 is a view illustrating an image pattern of a test video according to at least one example embodiment, and FIG. 8 is a view illustrating an image pattern of a test video according to another example embodiment.

When representing image data, the video system 10 classifies and processes the image data into R (Red), G (Green), and B (Blue) channel, or Y (Luma), U (Chroma Blue, Cb), and V (Chroma Red, Cr) channel, etc., but the example embodiments are not limited thereto. The example embodiment of FIG. 7 describes a case of processing the image data in the RGB channel, and the example embodiment of FIG. 8 describes a case of processing the image data in the YUV channel.

Referring to FIG. 7, unlike FIG. 6, a test frame tvd4 may display a color pattern of an RGB channel represented by two different color level values for one color.

For example, when each color is represented in 8 stages, the color of each sub-region may be represented as a pattern of 3 bits, but is not limited thereto. As described in FIG. 6, the color may be represented as colors of different densities according to and/or based on color level values.

In the case of R (Red) in the illustrated example, an R1 region having pixel information of 250 may be represented in red color corresponding to a color level value of 7, and an R2 region having pixel information of 100 may be represented in red color corresponding to a color level value of 3, etc. In the case of G (Green), a G1 region having pixel information of 2001 may be represented in green color corresponding to a color level value of 6, and a G2 region having pixel information of 50 may be represented in green color corresponding to a color level value of 1, etc. In the case of B (Blue), a B1 region having pixel information of 150 may be represented in blue color corresponding to a color level value of 4, and a B2 region having pixel information of 0 may be represented in blue color corresponding to a color level value of 0, etc.

Accordingly, the frame number may be represented with 18 bits obtained by combining the previous RGB colors R1, G1, and B1 and the subsequent RGB colors R2, G2, and B2, etc. The frame number may be represented in the order of [B2 G2 R2 B1 G1 R1] from the 0-th bit to the 17-th bit, and the frame number of the 5943-th frame among 218 frames may be "000 001 011 100 110 111", but is not limited thereto.

That is, when the frame number of 18 bits sequentially increases or decreases, the color of the color pattern also changes according to and/or based on the increase or decrease of the frame number. Accordingly, the processor 210 may detect an error in the image output order, and may check whether the image is normally output by checking the color of the color pattern displayed on the display 230.

Referring to FIG. 8, unlike FIG. 6, a test frame tvd5 may display a color pattern of a YUV channel represented by two different color level values for one color, but the example embodiments are not limited thereto.

According to at least one example embodiment, as described in FIG. 7, in the YUV channel, by checking the color of the color pattern of the YUV channel according to and/or based on the frame number, it is possible to check whether the image is normally output and/or check whether there is an error in the image output order, etc.

According to another example embodiment, the color pattern may be displayed as a color represented by bits that are complementary to each other. For example, the frame number may be set so that the color level value of the preceding YUV is a complement to the color level value of the following YUV, but the example embodiments are not limited thereto.

In the illustrated example, in the case of Y (Yellow), the Y region may be represented in yellow color corresponding to a color level value 6 (e.g., bit value 110) with pixel information of 200, and the following complementary ~Y region may be represented in yellow color corresponding to a color level value of 1 (e.g., bit value 001) with pixel information of 55, but the example embodiments are not limited thereto. In the case of CB (Chrominance Blue), the CB region may be represented in chrominance blue color corresponding to a color level value 3 (e.g., bit value 011) with pixel information of 100, and the following complementary ~CB region may be represented in chrominance blue color corresponding to a color level value 4 (e.g., bit value 100) with pixel information of 155, but is not limited thereto. In the case of CR (Chrominance Red), the CR region may be represented in chrominance red color corresponding to a color level value 4 (e.g., bit value 100) with pixel information of 150, and the following complementary ~CR region may be represented in chrominance red color corresponding to a color level value 3 (e.g., bit value 011) with pixel information of 105, but is not limited thereto.

Accordingly, the frame number may be represented by combining a normal color and a complementary color of the normal color. In the illustrated example, the frame number may be represented as 18 bits obtained by combining a YUV color and a complementary ~Y~U~V color, but the example embodiments are not limited thereto. The frame number may be represented in the order of [CR CB Y~CR~CB~Y] from the 0-th bit to the 17-th bit, the YUV color may be the 286-th frame among 512 frames, and the complementary ~Y~CB~CR may be the 225-th frame among the 512 frames and may be "100 011 110 011 100 001", but is not limited thereto. That is, in the case of the complement between the upper 9 bits and the lower 9 bits, the processor 210 may check whether there is an error in the image output order using only the upper 9 bits or the lower 9 bits of the bit representation of the image pattern corresponding to the frame number, etc. Meanwhile, the processor 210 may use the remaining bits that are not used for error detection (e.g., when the upper 9 bits are used for error detection, the lower 9 bits) for checking whether the image is normally output, but the example embodiments are not limited thereto.

In the description of FIG. 8, the YUV channel has been described, but even when a color pattern is generated with an RGB channel or another color channel, each sub-region may be represented with RGB (normal color) and ~R~G~B (complementary color), respectively.

Figure 9:
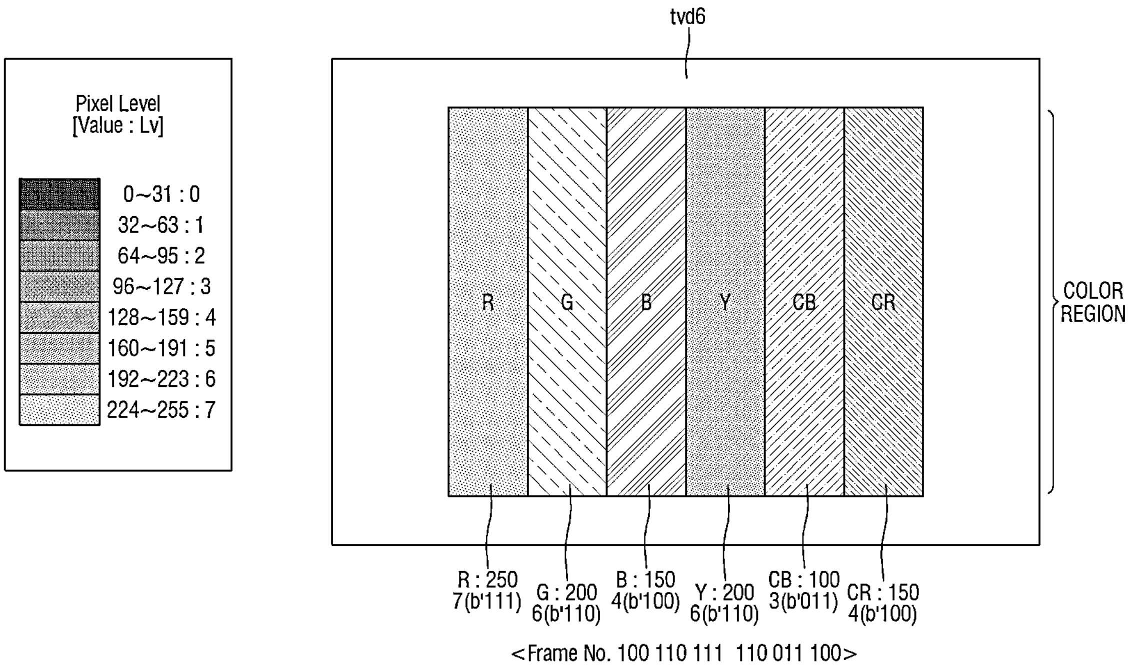
FIG. 9 is a view illustrating an image pattern of a test video according to at least one example embodiment.

FIG. 9 is a view illustrating an image pattern of a test video according to at least one example embodiment.

Referring to FIG. 9, a test frame tvd6 may be represented as a color pattern in which a first color channel and a second color channel are combined, but the example embodiments are not limited thereto. In the illustrated example, the test frame tvd6 may be represented as a color pattern including both RGB and YUV channel colors, but is not limited thereto. The test video may be displayed on the display 230 regardless of which type of color channel is supported by representing a color pattern of a channel in which the two types are mixed regardless of whether it is an RGB channel and/or a YUV channel. The processor 210 may detect whether an image is normally output (e.g., correctly output) through whether a frame output order is normal (e.g., correct) and various types of color channels are displayed.

In this case, as described above according to some example embodiments, by setting different color level values for each pixel information of each sub-region, the pixel information may be represented as a color density according to and/or based on the color level value.

Figure 10:
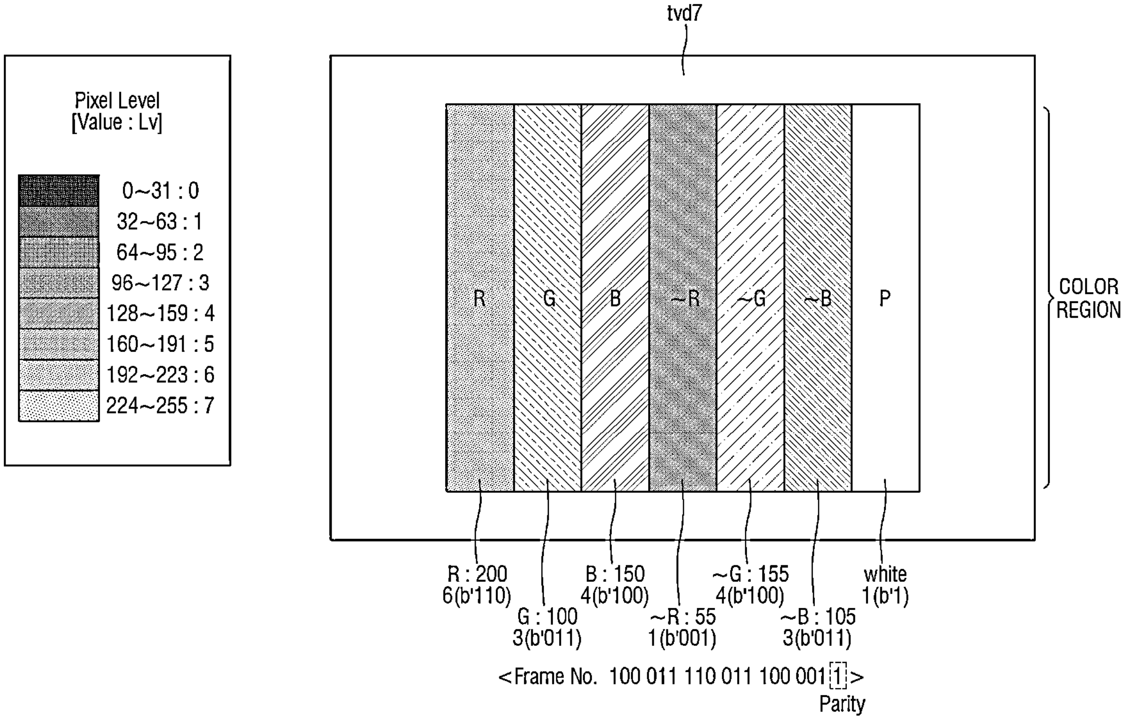
FIGS. 10 and 11 are views illustrating an image pattern of a test video according to some example embodiments.
Figure 11:
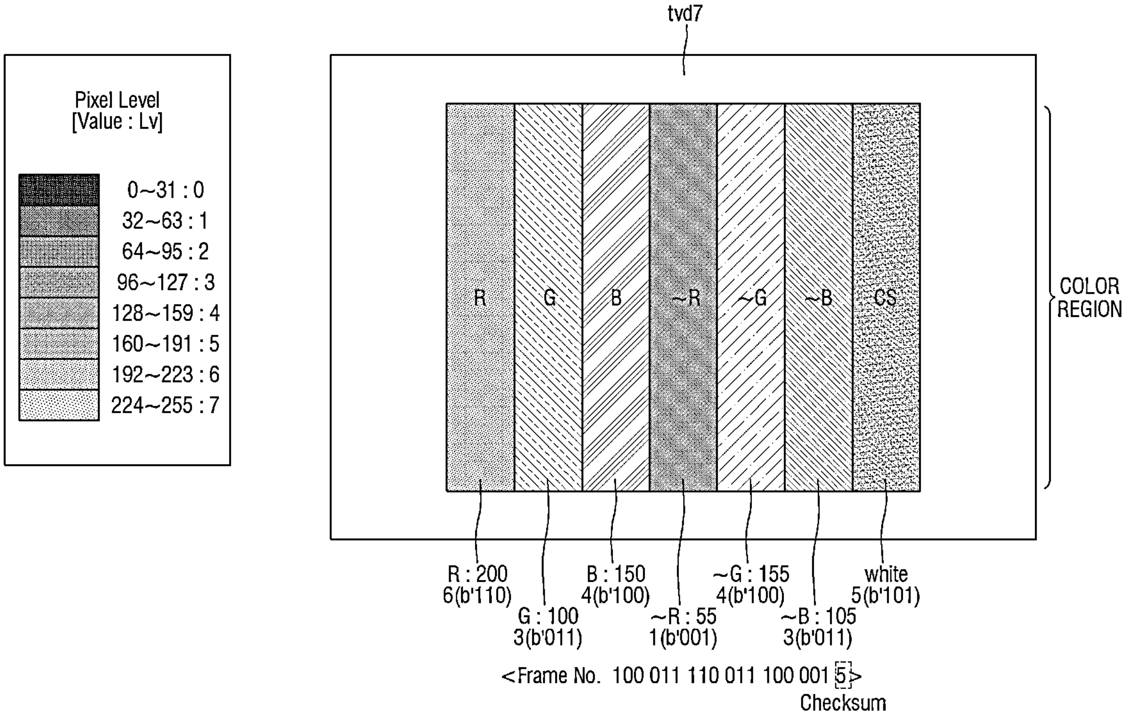

FIGS. 10 and 11 are views illustrating an image pattern of a test video according to some example embodiments.

The plurality of frames included in the test video each have a frame number for identifying each frame, but if there is a problem with the frame number itself, there is a problem with data integrity. For data integrity, according to some example embodiments, the test frame may further include error information for detecting an error in the frame number itself.

For example, it is assumed that an image pattern corresponding to a frame number is represented in RGB color and complementary RGB color, but is not limited thereto. The image pattern is converted into frame numbers, e.g., "100 011 110 011 100 001" representing the 286-th frame and the 225-th frame among the 512 frames, corresponding to the RGB color and the complementary RGB color, but the example embodiments are not limited thereto.

Referring to FIG. 10, the error information may be parity bits according to at least one example embodiment, but is not limited thereto. A parity bit region P may be further included at the end of the test image pattern, and the parity bit P may be represented as error information according to and/or based on the number of "1"s in the frame number. It is assumed that if the number of "1"s is an odd number, the parity bit is represented by "1" and the parity bit region P is represented by white, and if the number of "1"s is an even number, the parity bit is represented by "0" and the parity bit region P is represented by black, but the example embodiments are not limited thereto. In the illustrated example, since the number of "1"s in the frame number is an odd number, the parity bit region P may be displayed in white, but is not limited thereto.

According to various example embodiments, the parity bit region is not limited to the above example embodiment and may be represented by two or more bits and/or the color thereof may also be represented in desired and/or preset colors other than black and white, etc.

Referring to FIG. 11, the error information may be a checksum according to at least one example embodiment. The test image pattern further includes a checksum region CS, and a value obtained by dividing a value obtained by adding all color level values by all level stages may be represented as a color of the checksum region CS as a checksum value, but the example embodiments are not limited thereto.

In the illustrated example, a value of 5 obtained by dividing the sum of color level values 6+3+4+1+4+3+5 of the RGB color and the complementary RGB color by all level stages 8 may be used as a checksum value, etc. The checksum region CS may be represented as a gray color with a density corresponding to a level of 5 among 0 to 7 levels, but the example embodiments are not limited thereto.

Although not illustrated, according to another example embodiment, the error information may be a cyclical redundancy check (CRC), but is not limited thereto. The test image pattern may further include a CRC region, and a CRC calculation value of a binary pattern of a frame number may be represented in the CRC region, etc.

That is, the error information may be included in the image pattern according to various example embodiments capable of checking integrity, such as a parity bit, a checksum value, and/or a CRC value, etc.

Figure 12:
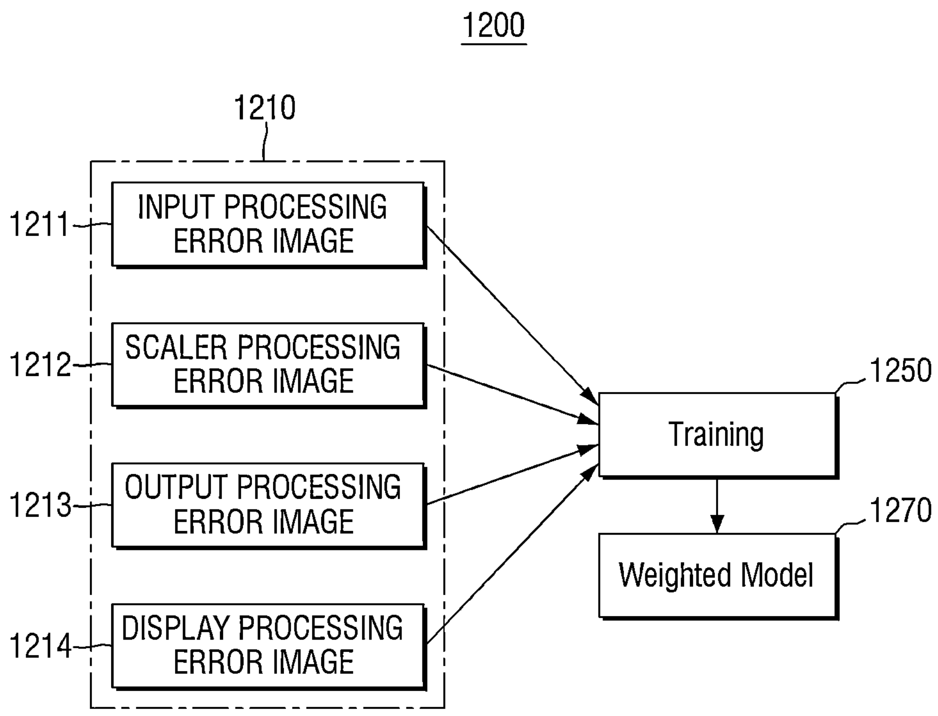
FIG. 12 is a view for describing an operation of a weighted model learned through machine learning according to some example embodiments.

FIG. 12 is a view for describing an operation of a weighted model learned through machine learning according to some example embodiments.

Referring to FIG. 12, the video system 10 includes a training module 1250 and/or a weighted model 1270, etc., but is not limited thereto. According to some example embodiments, one or more of the training module 1250 and/or the weighted model 1270, etc., may be implemented as processing circuitry. Processing circuitry may include hardware or hardware circuit including logic circuits; a hardware/software combination such as a processor executing software and/or firmware; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc., but is not limited thereto.

The training module 1250 (e.g., a machine learning module, a neural network training module, an artificial intelligence learning module, etc.) trains to detect errors in video frames by receiving at least one input processing error image 1211 in which at least one error occurs in the input module (e.g., the input module 260 in FIG. 2) is present and/or reflected, a scaler processing error image 1212 in which an error occurring in the scaler (e.g., scaler 270 in FIG. 2) is present and/or reflected, an output processing error image 1213 in which an error occurring in the output module (e.g., output module 280 in FIG. 2) is present and/or reflected, and/or a display processing error image 1214 in which an error occurring in the display (e.g., display 230 in FIG. 2) is present and/or reflected, among the sampling videos sv1, sv2, sv3, and 1*sv* output from the sink device 200, and receiving a normal image (e.g., error free image, error free video, etc.) including a binary pattern and/or a color pattern and does not contain errors, but the example embodiments are not limited thereto. The training module 1250 trains various processing error images compared to the normal image, and the weighted model 1270 trains by assigning weights according to and/or based on the type of error and the cause and source of the error from the trained processing error image, etc.

For example, the training module 1250 assigns weights for the type of error, the cause and/or source of the error, etc., to an image pattern mapped to a frame number of the processing error image, and stores the weights in the weighted model 1270, but the example embodiments are not limited thereto.

Figure 13:
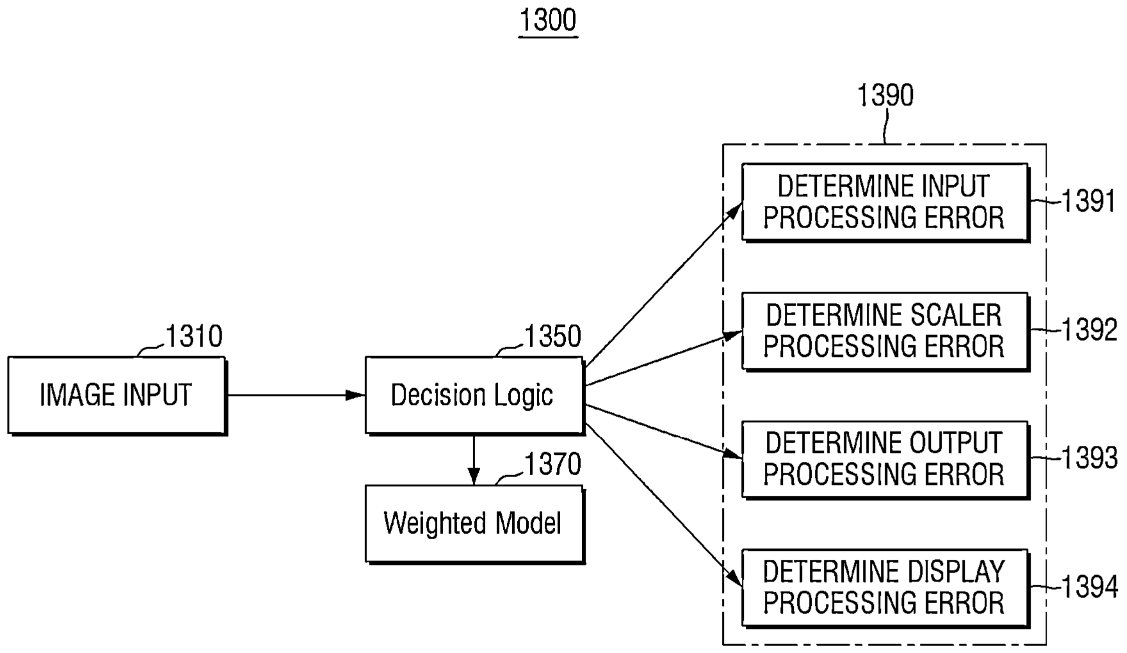
FIG. 13 is a view illustrating an error detection method according to reproduction of a test video according to at least one example embodiment.

FIG. 13 is a view illustrating an error detection method according to reproduction of a test video according to at least one example embodiment.

Referring to FIG. 13, the video system 10 includes a weighted model 1370 and/or a decision logic 1350, etc., but is not limited thereto. According to some example embodiments, one or more of the weighted model 1370 and/or the decision logic 1350, etc., may be implemented as processing circuitry. Processing circuitry may include hardware or hardware circuit including logic circuits; a hardware/software combination such as a processor executing software and/or firmware; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc., but is not limited thereto. When a test video 1310 is input to the video system 10, the video system 10 reproduces the test video. The decision logic 1350 of the video system 10 checks whether at least one error occurs while reproducing the video. If the error is detected, the decision logic 1350 refers to the weighted model 1370 and determines the type of error, the cause of the error, and/or the source of the error based on the image pattern included in the test video in which the error occurred, etc.

For example, if the error is detected by reproducing the test video 1310, the decision logic 1350 may determine that the input video 1310 was normally processed in another block in the sink device 200, but is a processing error 1393 due to the operation of the scaler 270, based on the data trained from the weighted model 1370, etc.

Figure 14:
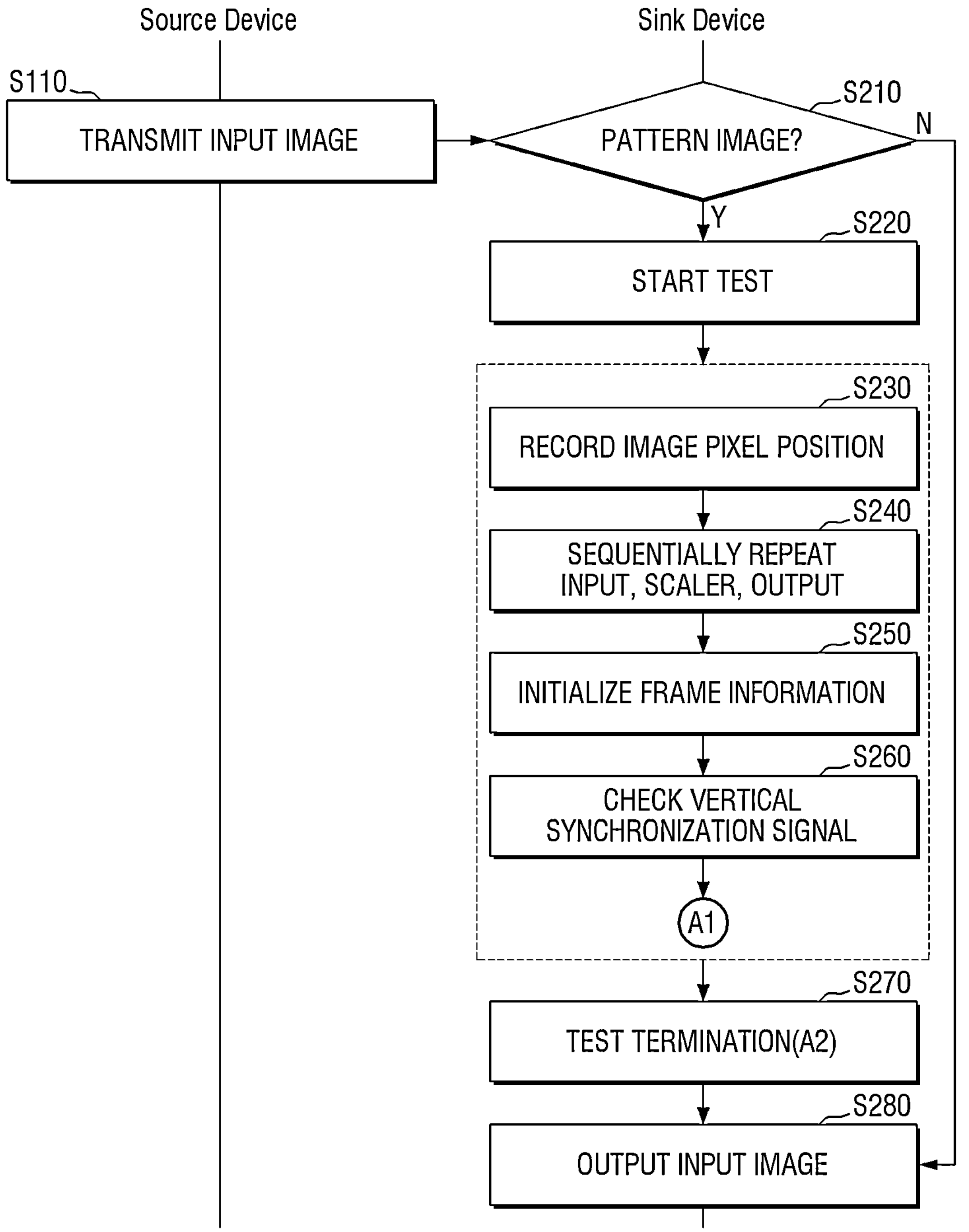
FIGS. 14 and 15 are flowcharts illustrating a method of generating an image pattern of a test video according to some example embodiments.
Figure 15:
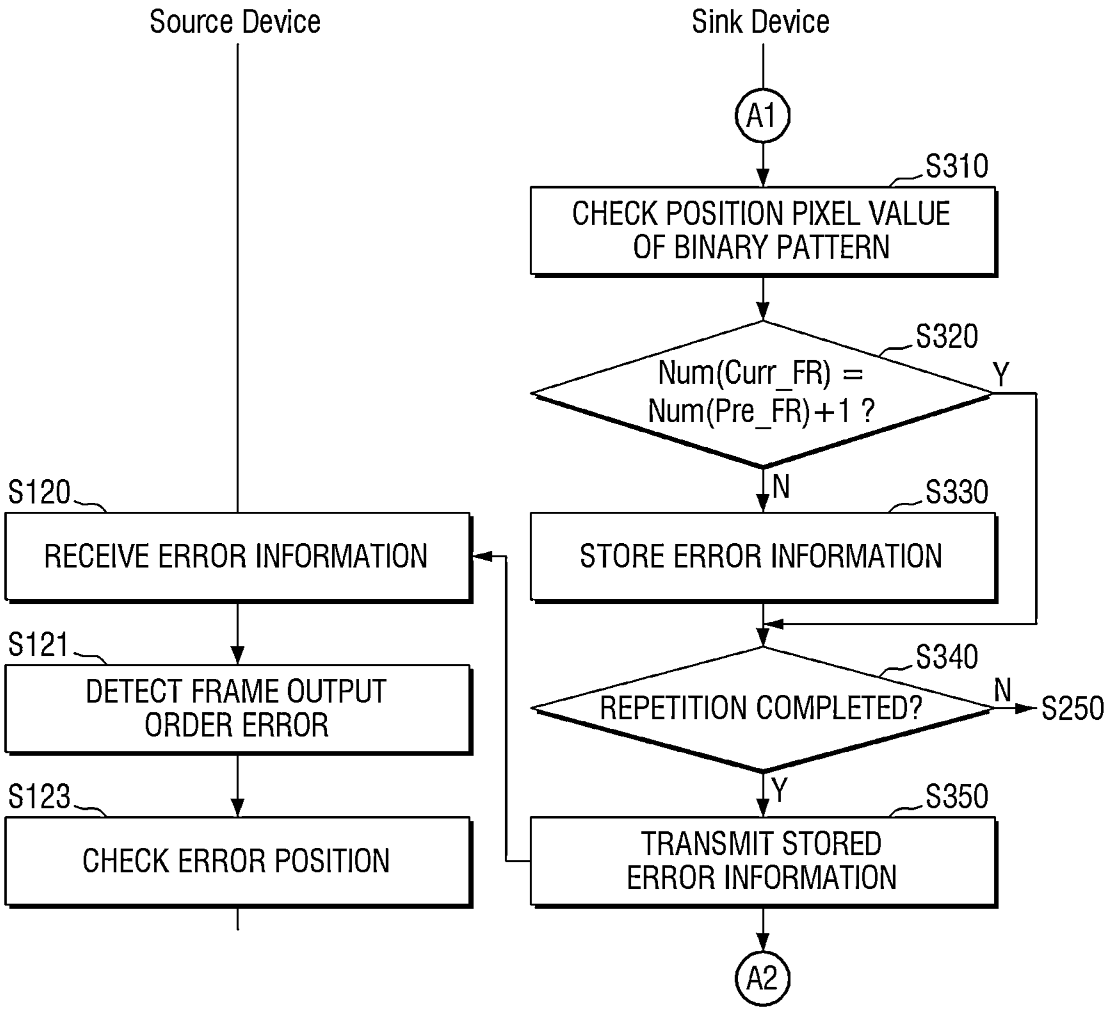

FIGS. 14 and 15 are flowcharts illustrating methods of generating an image pattern of a test video according to some example embodiments.

A more detailed description will be provided with reference to FIGS. 14 and 15, but the example embodiments are not limited thereto. In the video system 10, the source device transmits the input image (S110), and upon receiving the video, the sink device checks whether the received video is a test video including a binary pattern and a color pattern and/or a normal video (S210), but the example embodiments are not limited thereto. If the video is checked as the test video (S210, Y), a test mode is entered and the video test starts (S220).

If the video test starts, the sink device records and/or identifies a pixel position of the image pattern included in the test video based on the display 230 (S230). Since the pixel position may vary depending on the setting (e.g., resolution) of the display 230, the pixel position of the color included in the pattern is mapped and recorded.

Thereafter, the processing operations, e.g., standardization operation, scaling operation, image quality processing operation, etc., are sequentially repeated for each frame of the test video received from each of the video processors 260, 270, and 280 of the sink device (S240), but the example embodiments are not limited thereto.

The sink device initializes previously set frame information (e.g., stored and/or pre-stored frame number, etc.) prior to full-scale test operations (e.g., A1 to A2) (S250), and checks a vertical synchronization signal that may check whether a new frame is input (S250).

According to some example embodiments, the test video may include only a binary pattern per frame, but is not limited thereto. Referring to FIG. 15, if the vertical synchronization signal is toggled and the new frame is input, the sink device checks a position pixel value of the binary pattern in the received frame image (S310). That is, based on the position recorded in S230, the sink device checks the position of the binary pattern and checks the pixel value at the position. The pixel value of the binary pattern may be displayed in black or white with bits corresponding to the current frame number, but is not limited thereto. For example, the pixel value of the binary pattern may be displayed as in the binary pattern of FIG. 4, but the example embodiments are not limited thereto. Additionally, if the pixel of the binary pattern (e.g., the BW4 block in FIG. 4) is 2 bits or more, the sink device determines whether a black-white color level corresponding to the bit value matches an expected pixel value, but the example embodiments are not limited thereto.

The sink device checks whether the current frame number based on the pixel value of the displayed binary pattern is sequential to the previous frame number (e.g., is in sequence to the previous frame), and if the sink device determines that the current frame number was sequentially output (S320, Y), the sink device checks whether such sequential output was performed for all frames of the test video (S340). If checking the position pixel value for all frames is not repeated by the sink device (S340, N), the sink device initializes the current frame number (S250), checks the vertical synchronization signal (S260), receives the next frame, and operations S310 and S320 are repeated.

If, in operation S320, the pixel value corresponding to the current frame number of the binary pattern was not sequentially output compared to the pixel value of the previous frame (S320, N), the sink device determines that an error in which frames were not sequentially output has occurred, and transmits error information corresponding to the output order error to the source device (S330).

The source device receives the error information (S120), detects an output order error in the frame (S121), and checks the device (e.g., component) that caused the output order error, that is, an error position (S123). According to some example embodiments, the source device may display the checked error information and/or error position on the display of the sink device, and/or may transmit the error information and error position to a desired and/or preset external device, etc.

Figure 16:
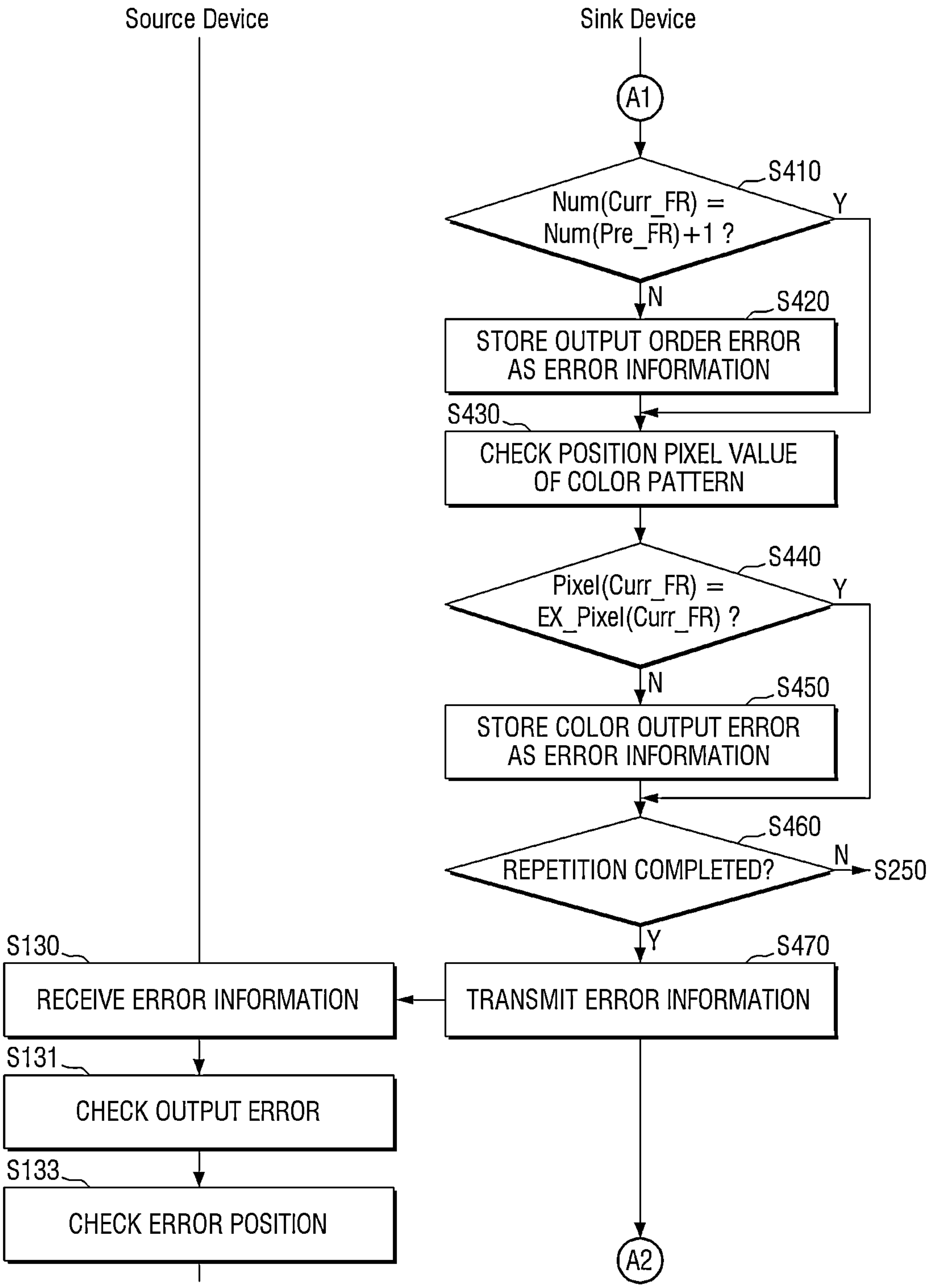
FIGS. 16 and 17 are flowcharts illustrating an operation method for error detection of an electronic device.
Figure 17:
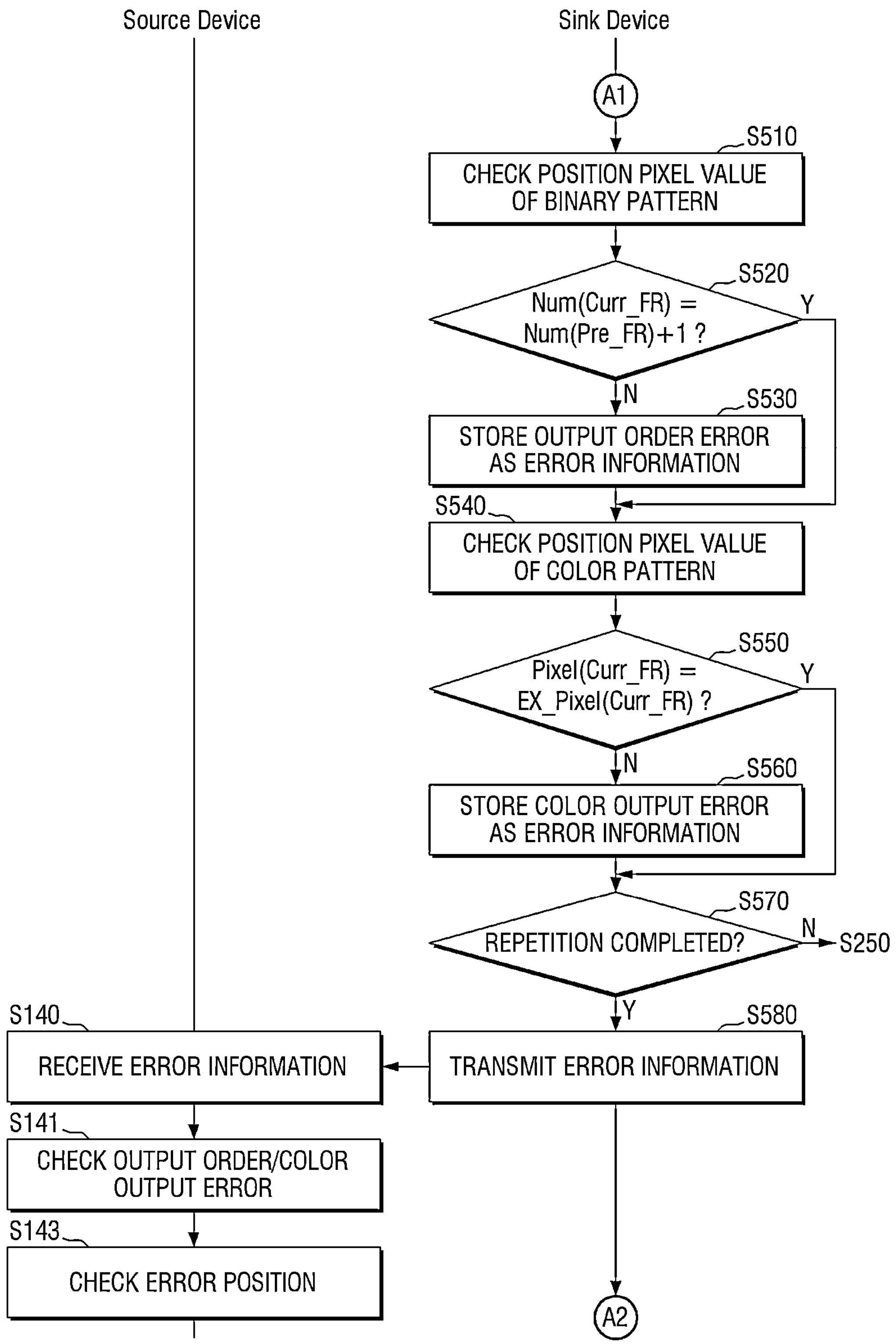

FIGS. 16 and 17 are flowcharts illustrating operation methods for error detection of an electronic device.

According to some example embodiments, the test video may include a single test pattern per frame, but the example embodiments are not limited thereto, and for example, a plurality of test patterns may be included in a frame. Referring to FIG. 16, if the vertical synchronization signal is toggled and the new frame is input, the sink device checks whether the current frame number is sequential to the previous frame number, and if it is checked that the current frame number was sequentially output after the previous frame number (S410, Y), the sink device checks a position pixel value of the color pattern in the received frame image (S430). However, if it is determined that the current frame number was not sequentially output, such as skipping and/or retrogressing, etc., compared to the previous frame number (S410, N), the sink device considers that an output order error has occurred and stores the output order error as error information (S420). Additionally, according to some example embodiments, as illustrated in FIG. 10 or 11, if it is determined that there is an error in the frame number itself based on the integrity information of the frame number, the sink device determines and/or considers that an error in the frame output order has occurred and stores the output order error according to and/or based on the integrity information as error information (S420).

The sink device checks the position pixel value of the color pattern, and checks whether each pixel value (e.g., Pixel value (Curr_FR)) in the color pattern in the current frame is an expected pixel value (e.g., EX_Pixel (Curr_FR)) corresponding to the current frame number (S440). For example, as illustrated in FIG. 7, the sink device checks whether the pixel values displayed in the color patterns R1, G1, B1, R2, G2, and B2 of the current frame are equal to expected pixel values 250, 200, 150, 100, 50, 0 corresponding to the current frame number 000 001 011 100 110 111, etc.

If the pixel values of the color pattern do not match the expected pixel values (S440, N), is the sink device determines that a color output error has occurred. The color output error may be based on the frame number output order error, may be an error generated by the video processor 260, 270, and 280 in the sink device, and/or may be due to errors in the display 230 itself. According to some example embodiments, as described with reference to FIGS. 12 and 13, the color pattern within the frame may be the color pattern of the error image 1310 learned and/or determined to easily detect the error of each video processor. If the pixel value of the color pattern matches the expected pixel value (S440, Y), operations S410 to S450 are repeated for all frames (S460).

If the repetition of the output error check is completed for all frames (S460, Y), the output order error and/or color output error stored during the test is transmitted to the source device as error information (S470). The source device receives the error information (S130), checks and/or determines what type of error it is (S131), and checks the error position where the error occurred (S133). According to some example embodiments, the source device may display the checked error information and/or error position on the display of the sink device, and/or may transmit the error information and error position to a desired and/or preset external device.

According to some example embodiments, the test video may include a binary pattern and/or a color pattern per frame, etc. Referring to FIG. 17, if the vertical synchronization signal is toggled and the new frame is input, the sink device checks a position pixel value of the binary pattern in the received frame image (S510). That is, based on the position recorded in S230, the sink device checks the position of the binary pattern and checks the pixel value of the position, but is not limited thereto. The pixel value of the binary pattern may be displayed in black or white with bits corresponding to the current frame number, but the example embodiments are not limited thereto. For example, the pixel value of the binary pattern may be displayed as in the binary pattern of FIG. 4 or 5, but is not limited thereto.

The sink device checks whether the current frame number is in sequence to the previous frame number, and if the sink device determines that the current frame number was sequentially output (e.g., in sequence, etc.) (S520, Y), the sink device checks a position pixel value of the color pixel in the received frame image (S540). However, if the sink device determines that the current frame number is not sequentially output, e.g., a frame was skipped, repeated, etc., compared to the previous frame number (S520, N), the sink device determines that an output order error has occurred and stores the output order error as error information (S530). Additionally, according to some example embodiments, as illustrated in FIG. 10 or 11, if it is determined that there is an error in the frame number itself based on the integrity information of the frame number, the sink device determines that an error in the frame output order has occurred and stores the output order error according to the integrity information as error information (S530).

The sink device checks the position pixel value of the color pattern, and checks whether each pixel value (e.g., Pixel value (Curr_FR)) in the color pattern in the current frame is (e.g., matches) an expected pixel value (e.g., EX_Pixel (Curr_FR)) corresponding to the current frame number (S550). For example, as illustrated in FIGS. 7 to 11, the sink device checks whether the pixel values displayed in the color patterns of the current frame are equal to expected pixel values corresponding to the current frame number, but the example embodiments are not limited thereto.

If the pixel value of the color pattern does not match the expected pixel value (S550, N), the sink device determines that a color output error has occurred. The color output error may be based on the frame number output order error, may be an error generated by the video processor 260, 270, and 280 in the sink device, and/or may be due to errors in the display 230 itself. According to some example embodiments, as described with reference to FIGS. 12 and 13, the color pattern within the frame may be the color pattern of the error image 1310 learned to and/or determined to easily detect the error of each video processor, but the example embodiments are not limited thereto. If the pixel value of the color pattern matches the expected pixel value (S550, Y), operations S510 to S560 are repeated for all frames (S570).

If the repetition of the output error check is completed for all frames (S570, Y), the output order error and/or color output error stored during the test is transmitted to the source device as error information (S580). The source device receives the error information (S140), checks what type of error it is (S141), and checks the error position where the error occurred (S143). According to some example embodiments, the source device may display the checked error information and/or error position on the display of the sink device, and/or may transmit the error information and error position to a desired and/or preset external device, etc.

Thereafter, the images of the current frame and the past frame are initialized by the sink device (S250, FIG. 14), and the sink device determines whether a new frame is input as the vertical synchronization signal of the frame (S260). The video system 10 maps the pixel positions recorded in operations S230 and the binary pattern of the test video to check respective position pixel values (S510), and checks whether the frame is sequentially output. That is, if the current frame is sequentially output to the past frame, is the sink device checks whether an error also occurs in the color pattern (S520). If the current position pixel value of the color pattern has an expected color value corresponding to the frame number of the test video (S550), is the sink device determines that there is no error, and operations S510 to S560 are repeated for the next frame. However, if the current position pixel value of the color pattern does not match the expected color value corresponding to the frame number of the test video (S550, N), is the sink device determines that an error has occurred in the video system 10 and information on the error position and the occurrence of the error is transmitted (S560 to S580).

Various example embodiments of the inventive concepts have been described hereinabove with reference to the accompanying drawings, but it will be understood by one of ordinary skill in the art to which the example embodiments of the inventive concepts pertains that various modifications and alterations may be made without departing from the technical spirit or essential feature of the inventive concepts. Therefore, it should be understood that the example embodiments described above are illustrative in all aspects and not restrictive.

What is claimed is:

1. A sink device comprising:

processing circuitry configured to, receive a test video from a source device, the test video including a plurality of frames and each frame of the plurality of frames including a type pattern of a plurality of type patterns, each type pattern of the plurality of type patterns corresponding to a frame number of a respective frame of the plurality of frames, and each type pattern of the plurality of type patterns being different, perform a standardization operation on the test video to generate a standardized video, scale the standardized video to generate a scaled video, perform an image quality processing operation on the scaled video to generate a sampling video, output the sampling video to a display, the display configured to display the sampling video as a final sampling video, and detect at least one error generated in any one of the source device, the processing circuitry, or the display comparing pixel values in each of the standardized video, the scaled video, the sampling video, and the final sampling video to desired pixel values corresponding to the type pattern included in each of the plurality of frames of the test video.

2. The sink device of claim 1, wherein each frame includes at least one type pattern corresponding to the frame number, the at least one type pattern being at least one of a binary type pattern and a color type pattern.

3. The sink device of claim 2, wherein each frame further includes integrity information corresponding to the frame number.

4. The sink device of claim 2, wherein the processing circuitry is further configured to:

determine whether the frame numbers of the plurality of frames are sequentially output based on pixel values corresponding to the at least one type pattern of the respective frame number; and detect a frame output order error based on results of the determining.

5. The sink device of claim 1, wherein the frame number is a binary number identifying the respective frame in the plurality of frames, the binary number including a plurality of binary bits; and the type pattern for each frame is displayed in color with at least two pixels corresponding to the binary number of the respective frame.

6. The sink device of claim 5, wherein each frame of the test video includes a binary pattern displayed in a first sub-region within the frame, the binary pattern representing the binary number of the frame number using two different colors.

7. The sink device of claim 5, wherein each frame of the test video includes a color pattern displayed in a second sub-region within the frame, the color pattern representing the binary number of the frame number using a plurality of colors.

8. The sink device of claim 7, wherein the color pattern includes the at least two pixels, and each of the at least two pixels of the color pattern having a color level value representing at least two bit values.

9. The sink device of claim 2, wherein each frame of the test video includes a color pattern; and the color pattern includes a first channel color and a second channel color, the first channel color and the second channel color having color values based on the frame number.

10. The sink device of claim 9, wherein the second channel color is a channel color of a different type from the first channel color.

11. The sink device of claim 9, wherein the second channel color has a color value corresponding to a complementary bit value of a bit value of the first channel color.

12. An electronic device, the electronic device comprising:

processing circuitry configured to, receive a test video from an input device, the test video including a plurality of frames, each frame of the plurality of frames including at least two type patterns of a plurality of type patterns, each type pattern of the plurality of type patterns corresponding to a frame number of a respective frame of the plurality of frames, and each type pattern of the plurality of type patterns being different;

process and convert the test video into an intermediate sampling video;

process the intermediate sampling video into a final sampling video and output the final sampling video to a display; and detect a frame output order error or a color output error in the processing circuitry or the display based on pixel values corresponding to the plurality of frame numbers included in each of the test video, the intermediate sampling video, and the final sampling video, each frame of the test video, the intermediate sampling video, and the final sampling video including a binary pattern and a color pattern, the binary pattern representing the frame number of the respective frame using a binary number, and the color pattern generated based on the binary pattern.

13. The electronic device of claim 12, wherein the test video includes a first sub-region in each frame, and the binary pattern of the respective frame included in the first sub-region, the binary pattern based on two different colors.

14. The electronic device of claim 13, wherein the test video includes a second sub-region spaced apart from the first sub-region in each frame, the color pattern of the respective frame included in the second sub-region.

15. The electronic device of claim 12, wherein the binary pattern includes the binary number and error information associated with the frame number.

16. An electronic device, the electronic device comprising:

processing circuitry configured to, receive a test video from an input device, the test video including a plurality of frames, and each frame of the plurality of frames including at least one type pattern corresponding to a frame number for a respective frame of the plurality of frames, and each type pattern of the plurality of type patterns being different;

process and convert the test video to an intermediate sampling video;

process the intermediate sampling video to a final sampling video and output the final sampling video to a display; and determine whether an error has occurred in the processing circuitry or the display using a weighted model on each of the test video, the intermediate sampling video, and the final sampling video.

17. The electronic device of claim 16, wherein each frame of the test video includes at least a first pattern type and a second pattern type;

the first pattern type being a binary pattern in a first sub-region of the respective frame, the binary pattern corresponding to the frame number of the respective frame converted into binary bits, the binary pattern represented in two different colors; and the second pattern type being a color pattern in a second sub-region of the respective frame, the color pattern corresponding to the frame number of the respective frame, the color pattern represented using a plurality of colors in a plurality of pixels.

18. The electronic device of claim 17, wherein each frame of the test video includes a plurality of sub-regions each using respectively different color channels; and each of the different color channels in each of the plurality of sub-regions is a color channel which represents the frame number of the respective frame by dividing a binary number corresponding to the frame number into at least two bits mapped to each of the sub-regions, the binary number including a plurality of binary bits.

19. The electronic device of claim 18, wherein the color pattern of each of the plurality of sub-regions is represented by at least one of a BW channel, an RGB channel, and a YCBCR channel.

20. The electronic device of claim 19, wherein the plurality of sub-regions include an RGB color and a complementary RGB color corresponding to the binary number.

* * * * *